US009933935B2

(12) United States Patent
Flint

(10) Patent No.: US 9,933,935 B2
(45) Date of Patent: Apr. 3, 2018

(54) DEVICE, METHOD, AND GRAPHICAL USER INTERFACE FOR EDITING VIDEOS

(75) Inventor: Gary W. Flint, Santa Cruz, CA (US)

(73) Assignee: APPLE INC., Cupertino, CA (US)

( * ) Notice: Subject to any disclaimer, the term of this patent is extended or adjusted under 35 U.S.C. 154(b) by 1636 days.

(21) Appl. No.: 13/335,838

(22) Filed: Dec. 22, 2011

(65) Prior Publication Data
US 2013/0055087 A1 Feb. 28, 2013

Related U.S. Application Data

(60) Provisional application No. 61/527,981, filed on Aug. 26, 2011.

(51) Int. Cl.
G06F 3/048 (2013.01)
G06F 3/0488 (2013.01)
G11B 27/034 (2006.01)
G11B 27/34 (2006.01)

(52) U.S. Cl.
CPC ........ G06F 3/04883 (2013.01); G11B 27/034 (2013.01); G11B 27/34 (2013.01)

(58) Field of Classification Search
None
See application file for complete search history.

(56) References Cited

U.S. PATENT DOCUMENTS

| 7,403,643 | B2* | 7/2008 | Ianculescu | G06K 9/00228 |
| | | | | 382/118 |
| 8,306,387 | B2* | 11/2012 | Yamashita | H04N 5/775 |
| | | | | 386/239 |
| 8,448,083 | B1 | 5/2013 | Migos et al. | |
| 2003/0043207 | A1* | 3/2003 | Duarte | G06F 3/0485 |
| | | | | 715/810 |
| 2004/0090548 | A1 | 5/2004 | Obrador | |
| 2004/0095375 | A1* | 5/2004 | Burmester | G06Q 10/06 |
| | | | | 715/716 |
| 2005/0007382 | A1* | 1/2005 | Schowtka | G06T 3/40 |
| | | | | 345/619 |

(Continued)

FOREIGN PATENT DOCUMENTS

| JP | 2008-104069 | 5/2008 |
| WO | 2009/076974 A1 | 6/2009 |

OTHER PUBLICATIONS

Office Action received for European Patent Application No. 12181460.2, dated Jan. 16, 2014, 6 pages.

(Continued)

Primary Examiner — Hua Lu
(74) Attorney, Agent, or Firm — Dentons US LLP

(57) ABSTRACT

An electronic device with a display and a touch-sensitive surface automatically crops a video content item in an editing mode of a video application; displays an automatically cropped area of the video content item on the display in the editing mode of the video application; and, while displaying the cropped area of the video content item on the display in the editing mode of the video application: detects a gesture on the touch-sensitive surface; and, in response to detecting the gesture on the touch-sensitive surface: overrides automatic cropping of the video content item by modifying the cropped area of the video content item in accordance with the gesture; and displays the modified cropped area of the video content item on the display.

28 Claims, 18 Drawing Sheets

(56) References Cited

U.S. PATENT DOCUMENTS

| | | | | |
|---|---|---|---|---|
| 2006/0001650 | A1* | 1/2006 | Robbins | G06F 3/0421 345/173 |
| 2006/0188173 | A1* | 8/2006 | Zhang | H04N 7/0122 382/276 |
| 2007/0120979 | A1* | 5/2007 | Zhang | G08B 13/19667 348/154 |
| 2007/0174774 | A1* | 7/2007 | Lerman | G06F 17/30017 715/723 |
| 2008/0222530 | A1* | 9/2008 | Lakshmanan | G06F 3/04892 715/735 |
| 2008/0260347 | A1* | 10/2008 | Widdowson | G11B 27/034 386/278 |
| 2009/0319887 | A1* | 12/2009 | Waltman | G06T 11/60 715/246 |
| 2010/0021141 | A1* | 1/2010 | Yamashita | H04N 5/775 386/356 |
| 2010/0053342 | A1* | 3/2010 | Hwang | H04N 5/2259 348/207.99 |
| 2010/0171712 | A1* | 7/2010 | Cieplinski | G06F 3/04883 345/173 |
| 2010/0171848 | A1* | 7/2010 | Peters et al. | G06K 9/00248 348/239 |
| 2010/0223128 | A1* | 9/2010 | Dukellis | G06Q 30/0253 705/14.51 |
| 2011/0013049 | A1* | 1/2011 | Thorn | G06F 3/0488 348/240.3 |
| 2011/0016419 | A1* | 1/2011 | Grosz | G06F 17/3028 715/769 |
| 2011/0167337 | A1* | 7/2011 | Paley | H04L 67/06 715/252 |
| 2011/0191719 | A1* | 8/2011 | Hinckley | G06F 3/033 715/835 |
| 2012/0019660 | A1* | 1/2012 | Golan | H04N 5/232 348/144 |
| 2013/0044240 | A1* | 2/2013 | Leskela | H04N 5/2253 348/239 |

OTHER PUBLICATIONS apple.com, "iMovie '09: Cropping and Rotating Your Video", available at <http://support.apple.com/kb/vi38> retrieved on Dec. 5, 2014, 1 page.

apple.com, "Rotating Photo or Video", iMovie 7.0 Help (iMovie '08), available at <http://docs.info.apple.com/article.html?path=iMovie/7.0/en/11925.html> downloaded on Aug. 5, 2011, 1 page.

Bove, Tony, "How to Crop and Rotate an iMovie Video Clip in iLife '11", For Dummies, available at <http://www.dummies.com/how-to/content/how-to-crop-and-rotate-an-imovie-video-clip-in-ili.html>, retrieved on Dec. 5, 2014, 2 pages.

Deselaers et al., "Pan, Zoom, Scan—Time-Coherent, Trained Automatic Video Cropping", IEEE Conference on Computer Vision and Pattern Recognition, Jun. 23-28, 2008, 8 pages.

IPAD, "iPad Video Editing", available at <http://web.archive.org/web/20130927005446/http://ipad-videoconverter.org/ipad-video-editing.html>, retrieved on Dec. 5, 2014, 4 pages.

Iskysoft, "How to Convert Video on Mac", available at <http://www.iskysoft.com/user-guide/video-converter-mac.html>, retrieved on Dec. 5, 2014, 11 pages.

Movie Cropper MAC, "How to Crop Video on Mac os x?", available at <http://software-download.name/video-cropper-for-mac/>, retrieved on Dec. 5, 2014, 3 pages.

Roberto, "ReelDirector 3.0 Brings Video Editing to iPad", available at <http://www.padgadget.com/2010/06/04/reeldirector-3-0-brings-video-editing-to-ipad/>, Jun. 4, 2010, 7 pages.

Schramm, M., "iPhoto 101: Use Two Fingers to Crop and Rotate Photos", available at <http://www.tuaw.com/2011/02/24/iphoto-101-use-two-fingers-to-crop-and-rotate-photos/>, Feb. 24, 2011, 3 pages.

Tchenj, "iPhoto Gestures", Mac OS X Hints, available at <http://hints.macworld.com/article.php?story=20110220193319802>, Feb. 24, 2011, 2 pages.

European Search Report dated Mar. 4, 2013, received in European Patent Application No. 12181460.2, which corresponds to U.S. Appl. No. 13/335,838, 8 pages (Flint).

Office Action received for Chinese Patent Application No. 201210308862.1, dated Apr. 23, 2015, 10 pages (3 pages of English Translation and 7 pages of Official Copy).

Intention to Grant Received for European Patent Application No. 12181460.2 dated Sep. 22, 2015, 6 pages.

Office Action received for Chinese Patent Application No. 201210308862.1, dated Jan. 26, 2016, 8 pages (3 pages of English Translation and 5 pages of Official Copy).

Decision to Grant received for European Patent Application No. 12181460.2, dated Mar. 3, 2016, 2 pages.

Notice of Allowance received for Chinese Patent Application No. 201210308862.1, dated Jul. 7, 2016, 4 pages (2 pages of English Translation and 2 pages of Official Copy).

* cited by examiner

DEVICE, METHOD, AND GRAPHICAL USER INTERFACE FOR EDITING VIDEOS

RELATED APPLICATIONS

This application claims the benefit of U.S. Provisional Patent Application No. 61/527,981, titled "Device, Method, and Graphical User Interface for Editing Videos," filed Aug. 26, 2011, which is incorporated by reference herein in its entirety.

TECHNICAL FIELD

This relates generally to electronic devices with touch-sensitive surfaces, including but not limited to electronic devices with touch-sensitive surfaces that edit videos.

BACKGROUND

The use of touch-sensitive surfaces as input devices for computers and other electronic computing devices has increased significantly in recent years. Exemplary touch-sensitive surfaces include touch pads and touch screen displays. Such surfaces are widely used to manipulate user interface objects on a display.

Exemplary user interface objects include video content items. Exemplary manipulations include video editing operations such as resizing, rotating, and panning. A user may need to perform such manipulations on video content items (e.g., video clips) in a video and sound (e.g., music) player/editor application (e.g., QuickTime Player from Apple Inc. of Cupertino, Calif.).

But existing methods for editing video content items ("videos") are cumbersome and inefficient, particularly for novice users. For example, editing a video to a desired resolution size or cropping area is tedious and creates a significant cognitive burden on a user. In addition, existing methods take longer than necessary, thereby wasting energy. This latter consideration is particularly important in battery-operated devices.

SUMMARY

Accordingly, there is a need for electronic devices with faster, more efficient methods and interfaces for editing videos. Such methods and interfaces may complement or replace conventional methods for editing videos. Such methods and interfaces reduce the cognitive burden on a user and produce a more efficient human-machine interface. For battery-operated devices, such methods and interfaces conserve power and increase the time between battery charges.

The above deficiencies and other problems associated with user interfaces for electronic devices with touch-sensitive surfaces are reduced or eliminated by the disclosed devices. In some embodiments, the device is a desktop computer. In some embodiments, the device is portable (e.g., a notebook computer, tablet computer, or handheld device). In some embodiments, the device has a touchpad. In some embodiments, the device has a touch-sensitive display (also known as a "touch screen" or "touch screen display"). In some embodiments, the device has a graphical user interface (GUI), one or more processors, memory and one or more modules, programs or sets of instructions stored in the memory for performing multiple functions. In some embodiments, the user interacts with the GUI primarily through finger contacts and gestures on the touch-sensitive surface. In some embodiments, the functions may include image and video editing, drawing, presenting, word processing, website creating, disk authoring, spreadsheet making, game playing, telephoning, video conferencing, e-mailing, instant messaging, workout support, digital photographing, digital videoing, web browsing, digital music playing, and/or digital video playing. Executable instructions for performing these functions may be included in a non-transitory computer readable storage medium or other computer program product configured for execution by one or more processors.

In accordance with some embodiments, a method is performed at an electronic device with a display and a touch-sensitive surface. The method includes: automatically cropping a video content item in an editing mode of a video application; displaying an automatically cropped area of the video content item on the display in the editing mode of the video application; and, while displaying the cropped area of the video content item on the display in the editing mode of the video application: detecting a gesture on the touch-sensitive surface; and, in response to detecting the gesture on the touch-sensitive surface: overriding automatic cropping of the video content item by modifying the cropped area of the video content item in accordance with the gesture; and displaying the modified cropped area of the video content item on the display.

In accordance with some embodiments, an electronic device includes a display, a touch-sensitive surface, one or more processors, memory, and one or more programs. The one or more programs are stored in the memory and configured to be executed by the one or more processors. The one or more programs include instructions for: automatically cropping a video content item in an editing mode of a video application; displaying an automatically cropped area of the video content item on the display in the editing mode of the video application; and, while displaying the cropped area of the video content item on the display in the editing mode of the video application: detecting a gesture on the touch-sensitive surface; and, in response to detecting the gesture on the touch-sensitive surface: overriding automatic cropping of the video content item by modifying the cropped area of the video content item in accordance with the gesture; and displaying the modified cropped area of the video content item on the display.

In accordance with some embodiments, a computer readable storage medium has stored therein instructions which when executed by an electronic device with a display and a touch-sensitive surface, cause the device to: automatically crop a video content item in an editing mode of a video application; display an automatically cropped area of the video content item on the display in the editing mode of the video application; and, while displaying the cropped area of the video content item on the display in the editing mode of the video application: detect a gesture on the touch-sensitive surface; and, in response to detecting the gesture on the touch-sensitive surface: override automatic cropping of the video content item by modifying the cropped area of the video content item in accordance with the gesture; and display the modified cropped area of the video content item on the display.

In accordance with some embodiments, a graphical user interface on an electronic device with a display, a touch-sensitive surface, a memory, and one or more processors to execute one or more programs stored in the memory includes an automatically cropped area of a video content item displayed in an editing mode of a video application; wherein, while displaying the cropped area of the video content item on the display in the editing mode of the video application: in response to detection of a gesture on the touch-sensitive surface: automatic cropping of the video content item is overridden by modifying the cropped area of the video content item in accordance with the gesture; and the modified cropped area of the video content item is displayed on the display.

In accordance with some embodiments, an electronic device includes: a display; a touch-sensitive surface; means for automatically cropping a video content item in an editing mode of a video application; means for displaying an automatically cropped area of the video content item on the display in the editing mode of the video application; and, means, enabled while displaying the cropped area of the video content item on the display in the editing mode of the video application, including: means for detecting a gesture on the touch-sensitive surface; and, means, enabled in response to detecting the gesture on the touch-sensitive surface, including: means for overriding automatic cropping of the video content item by modifying the cropped area of the video content item in accordance with the gesture; and means for displaying the modified cropped area of the video content item on the display.

In accordance with some embodiments, an information processing apparatus for use in an electronic device with a display and a touch-sensitive surface includes: means for automatically cropping a video content item in an editing mode of a video application; means for displaying an automatically cropped area of the video content item on the display in the editing mode of the video application; and, means, enabled while displaying the cropped area of the video content item on the display in the editing mode of the video application, including: means for detecting a gesture on the touch-sensitive surface; and, means, enabled in response to detecting the gesture on the touch-sensitive surface, including: means for overriding automatic cropping of the video content item by modifying the cropped area of the video content item in accordance with the gesture; and means for displaying the modified cropped area of the video content item on the display.

In accordance with some embodiments, an electronic device includes a display unit, a touch-sensitive surface unit configured to receive gestures, and a processing unit coupled to the display unit and the touch-sensitive surface unit. The processing unit is configured to: automatically crop a video content item in an editing mode of a video application; enable display of an automatically cropped area of the video content item on the display unit in the editing mode of the video application; and, while displaying the cropped area of the video content item on the display unit in the editing mode of the video application: detect a gesture on the touch-sensitive surface unit; and, in response to detecting the gesture on the touch-sensitive surface unit: override automatic cropping of the video content item by modifying the cropped area of the video content item in accordance with the gesture; and enable display of the modified cropped area of the video content item on the display unit.

Thus, electronic devices with displays and touch-sensitive surfaces are provided with faster, more efficient methods and interfaces for editing videos, thereby increasing the effectiveness, efficiency, and user satisfaction with such devices. Such methods and interfaces may complement or replace conventional methods for editing videos.

BRIEF DESCRIPTION OF THE DRAWINGS

For a better understanding of the aforementioned embodiments of the invention as well as additional embodiments thereof, reference should be made to the Description of Embodiments below, in conjunction with the following drawings in which like reference numerals refer to corresponding parts throughout the figures.

DESCRIPTION OF EMBODIMENTS

Figure 1A:
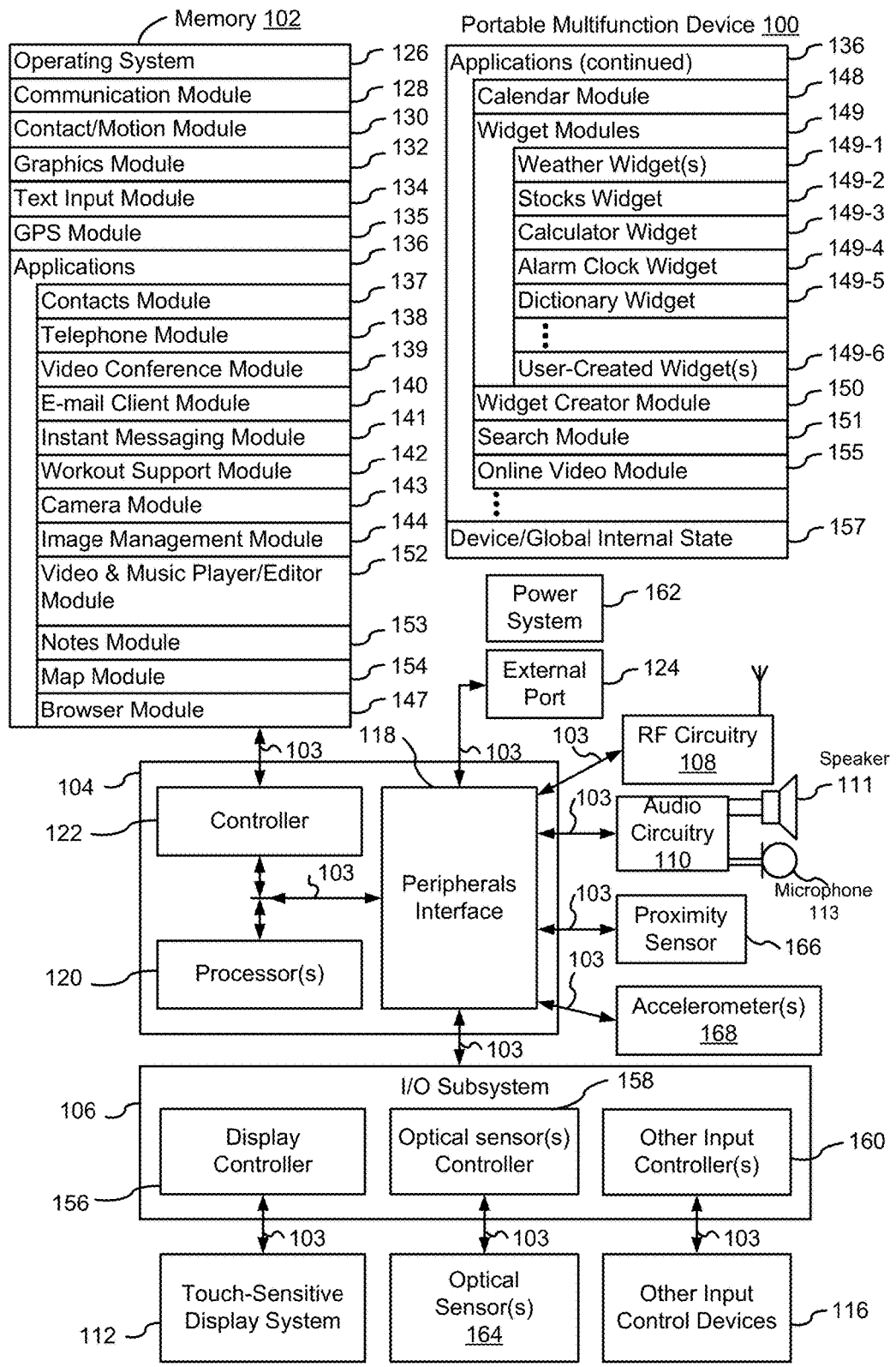
FIG. 1A is a block diagram illustrating a portable multifunction device with a touch-sensitive display in accordance with some embodiments.

Video editing may include combining videos clips of different resolutions and aspect ratios into a sequence that forms the final video. If the video clips do not conform to a single resolution and aspect ratio, transitions between portions in the final video may be jarring and unpleasing to viewers. Some video editing applications attempt to make the process for conforming resolutions and aspect ratios more user-friendly by automatically cropping and scaling video clips. However, the automatic cropping and scaling may not yield the results that a user desires. The embodiments described below facilitate overriding of the automatic cropping and scaling of videos, so that a user can quickly and easily edit a video to get the desired results. The overriding of the automatic cropping and scaling include gestures to activate various manual overrides, such as repositioning of the cropped video area, resizing of the cropped video area, and/or rotation of the cropped video area. The capability to override the automatic cropping and scaling provides the user flexibility to modify the result of the automatic cropping and scaling when the automatic result is undesirable. This is particularly useful for novice users, who want to make simple adjustments to the video clips in their videos and do not have the time or patience to learn complex editing procedures.

Below, FIGS. 1A-1B, 2, 3, and 7 provide a description of exemplary devices. FIGS. 4A-4B and 5A-5I illustrate exemplary user interfaces for editing videos. FIGS. 6A-6B are flow diagrams illustrating a method of editing videos. The user interfaces in FIGS. 5A-5I are used to illustrate the processes in FIGS. 6A-6B.

Exemplary Devices

Reference will now be made in detail to embodiments, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details. In other instances, well-known methods, procedures, components, circuits, and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

As used herein, the term "resolution" of a video content item (e.g., a video clip, a movie file, streaming video, etc.) refers to the number of pixels along each axis or in each dimension of the video content item. For example, a video content item may have a resolution of 640×480 pixels. That is, each frame in the video content item has the same resolution of 640 pixels wide and 480 pixels high. Further, as used herein, the term "aspect ratio" of the video content item refers to a ratio of the width of the video content item to its height. For example, the 640×480 video content item has a 4:3 aspect ratio. A video content item of one resolution may be changed to another resolution by removing or adding pixels and/or by resolution scaling. For example, a video content item of one resolution may be changed to a lower resolution by removing pixels (e.g., by cropping), resolution scaling, or a combination of both. As another example, a video content item of one resolution may be changed to a higher resolution by resolution scaling, adding pixels (e.g., letterboxing, pillarboxing, or the like) to make up any difference, or a combination of both.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch screen displays and/or touch pads), may also be used. It should also be understood that, in some embodiments, the device is not a portable communications device, but is a desktop computer with a touch-sensitive surface (e.g., a touch screen display and/or a touch pad).

In the discussion that follows, an electronic device that includes a display and a touch-sensitive surface is described. It should be understood, however, that the electronic device may include one or more other physical user-interface devices, such as a physical keyboard, a mouse and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that may be executed on the device may use at least one common physical user-interface device, such as the touch-sensitive surface. One or more functions of the touch-sensitive surface as well as corresponding information displayed on the device may be adjusted and/or varied from one application to the next and/or within a respective application. In this way, a common physical architecture (such as the touch-sensitive surface) of the device may support the variety of applications with user interfaces that are intuitive and transparent to the user.

Attention is now directed toward embodiments of portable devices with touch-sensitive displays. FIG. 1A is a block diagram illustrating portable multifunction device 100 with touch-sensitive displays 112 in accordance with some embodiments. Touch-sensitive display 112 is sometimes called a "touch screen" for convenience, and may also be known as or called a touch-sensitive display system. Device 100 may include memory 102 (which may include one or more computer readable storage mediums), memory controller 122, one or more processing units (CPU's) 120, peripherals interface 118, RF circuitry 108, audio circuitry 110, speaker 111, microphone 113, input/output (I/O) subsystem 106, other input or control devices 116, and external port 124. Device 100 may include one or more optical sensors 164. These components may communicate over one or more communication buses or signal lines 103.

It should be appreciated that device 100 is only one example of a portable multifunction device, and that device 100 may have more or fewer components than shown, may combine two or more components, or may have a different configuration or arrangement of the components. The various components shown in FIG. 1A may be implemented in hardware, software, or a combination of both hardware and software, including one or more signal processing and/or application specific integrated circuits.

Memory 102 may include high-speed random access memory and may also include non-volatile memory, such as one or more magnetic disk storage devices, flash memory devices, or other non-volatile solid-state memory devices. Access to memory 102 by other components of device 100, such as CPU 120 and the peripherals interface 118, may be controlled by memory controller 122.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data.

In some embodiments, peripherals interface 118, CPU 120, and memory controller 122 may be implemented on a single chip, such as chip 104. In some other embodiments, they may be implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 may include well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 may communicate with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication may use any of a plurality of communications standards, protocols and technologies, including but not limited to Global System for Mobile Communications (GSM), Enhanced Data GSM Environment (EDGE), high-speed downlink packet access (HSDPA), high-speed uplink packet access (HSUPA), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data may be retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 may include display controller 156 and one or more input controllers 160 for other input or control devices. The one or more input controllers 160 receive/send electrical signals from/to other input or control devices 116. The other input control devices 116 may include physical buttons (e.g., push buttons, rocker buttons, etc.), dials, slider switches, joysticks, click wheels, and so forth. In some alternate embodiments, input controller(s) 160 may be coupled to any (or none) of the following: a keyboard, infrared port, USB port, and a pointer device such as a mouse. The one or more buttons (e.g., 208, FIG. 2) may include an up/down button for volume control of speaker 111 and/or microphone 113. The one or more buttons may include a push button (e.g., 206, FIG. 2).

Touch-sensitive display 112 provides an input interface and an output interface between the device and a user. Display controller 156 receives and/or sends electrical signals from/to touch screen 112. Touch screen 112 displays visual output to the user. The visual output may include graphics, text, icons, video, and any combination thereof (collectively termed "graphics"). In some embodiments, some or all of the visual output may correspond to user-interface objects.

Touch screen 112 has a touch-sensitive surface, sensor or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and converts the detected contact into interaction with user-interface objects (e.g., one or more soft keys, icons, web pages or images) that are displayed on touch screen 112. In an exemplary embodiment, a point of contact between touch screen 112 and the user corresponds to a finger of the user.

Touch screen 112 may use LCD (liquid crystal display) technology, LPD (light emitting polymer display) technology, or LED (light emitting diode) technology, although other display technologies may be used in other embodiments. Touch screen 112 and display controller 156 may detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone®, iPod Touch®, and iPad® from Apple Inc. of Cupertino, Calif.

Touch screen 112 may have a video resolution in excess of 100 dpi. In some embodiments, the touch screen has a video resolution of approximately 160 dpi. The user may make contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 may include a touchpad (not shown) for activating or deactivating particular functions. In some embodiments, the touchpad is a touch-sensitive area of the device that, unlike the touch screen, does not display visual output. The touchpad may be a touch-sensitive surface that is separate from touch screen 112 or an extension of the touch-sensitive surface formed by the touch screen.

Device 100 also includes power system 162 for powering the various components. Power system 162 may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 may also include one or more optical sensors 164. FIG. 1A shows an optical sensor coupled to optical sensor controller 158 in I/O subsystem 106. Optical sensor 164 may include charge-coupled device (CCD) or complementary metal-oxide semiconductor (CMOS) phototransistors. Optical sensor 164 receives light from the environment, projected through one or more lens, and converts the light to data representing an image. In conjunction with imaging module 143 (also called a camera module), optical sensor 164 may capture still images or video. In some embodiments, an optical sensor is located on the back of device 100, opposite touch screen display 112 on the front of the device, so that the touch screen display may be used as a viewfinder for still and/or video image acquisition. In some embodiments, another optical sensor is located on the front of the device so that the user's image may be obtained for videoconferencing while the user views the other video conference participants on the touch screen display.

Device 100 may also include one or more proximity sensors 166. FIG. 1A shows proximity sensor 166 coupled to peripherals interface 118. Alternately, proximity sensor 166 may be coupled to input controller 160 in I/O subsystem 106. In some embodiments, the proximity sensor turns off and disables touch screen 112 when the multifunction device is placed near the user's ear (e.g., when the user is making a phone call).

Device 100 may also include one or more accelerometers 168. FIG. 1A shows accelerometer 168 coupled to peripherals interface 118. Alternately, accelerometer 168 may be coupled to an input controller 160 in I/O subsystem 106. In some embodiments, information is displayed on the touch screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

Figure 3:
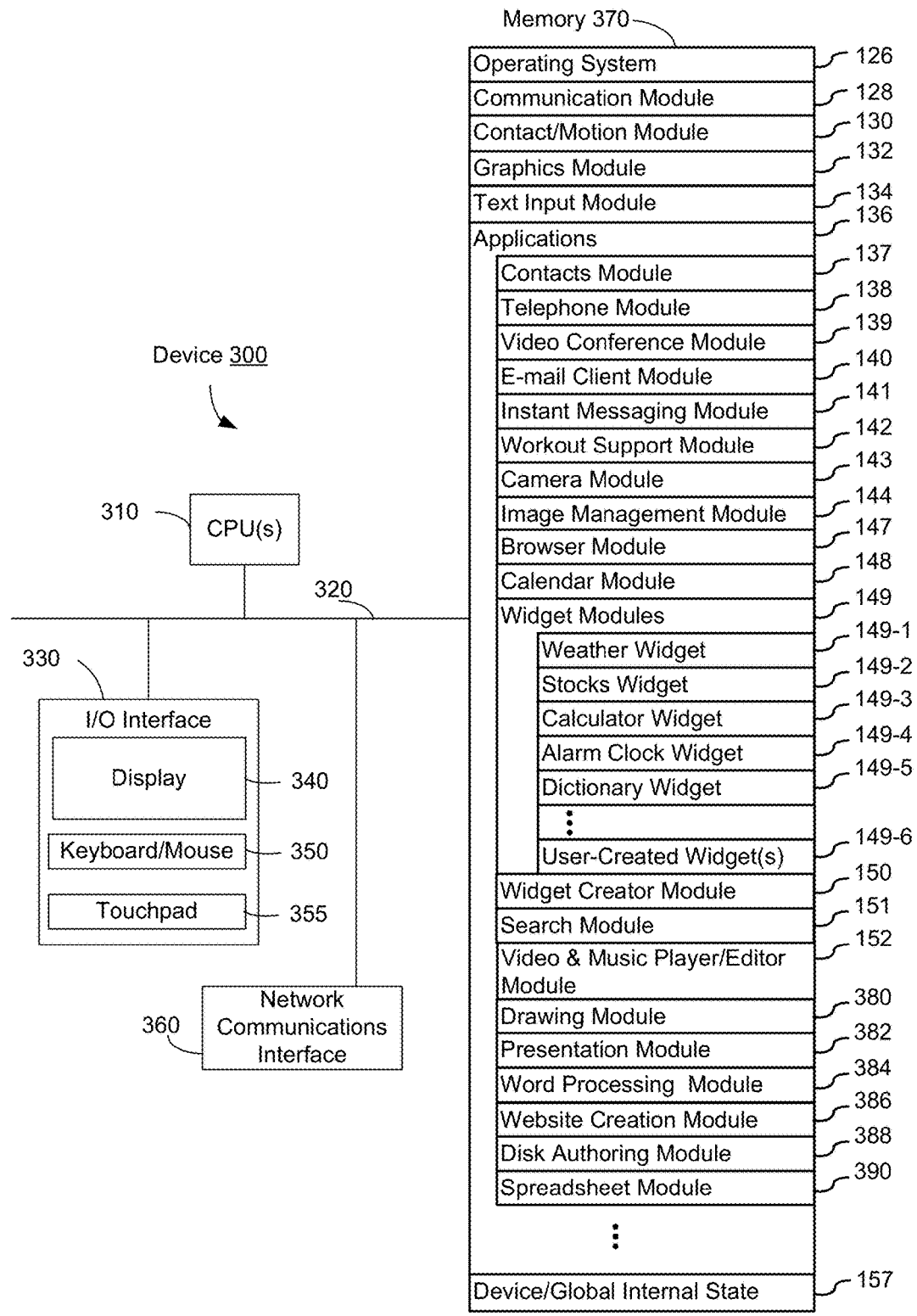
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments memory 102 stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used on iPod (trademark of Apple Inc.) devices.

Contact/motion module 130 may detect contact with touch screen 112 (in conjunction with display controller 156) and other touch sensitive devices (e.g., a touchpad or physical click wheel). Contact/motion module 130 includes various software components for performing various operations related to detection of contact, such as determining if contact has occurred (e.g., detecting a finger-down event), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, may include determining speed (magnitude), velocity (magnitude and direction), and/or an acceleration (a change in magnitude and/or direction) of the point of contact. These operations may be applied to single contacts (e.g., one finger contacts) or to multiple simultaneous contacts (e.g., "multitouch"/multiple finger contacts). In some embodiments, contact/motion module 130 and display controller 156 detect contact on a touchpad.

Contact/motion module 130 may detect a gesture input by a user. Different gestures on the touch-sensitive surface have different contact patterns. Thus, a gesture may be detected by detecting a particular contact pattern. For example, detecting a finger tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (lift off) event.

Graphics module 132 includes various known software components for rendering and displaying graphics on touch screen 112 or other display, including components for changing the intensity of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 132 stores data representing graphics to be used. Each graphic may be assigned a corresponding code. Graphics module 132 receives, from applications etc., one or more codes specifying graphics to be displayed along with, if necessary, coordinate data and other graphic property data, and then generates screen image data to output to display controller 156.

Text input module 134, which may be a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing, to camera 143 as picture/video metadata, and to applications that provide location-based services such as weather widgets, local yellow page widgets, and map/navigation widgets).

Applications 136 may include the following modules (or sets of instructions), or a subset or superset thereof:
  contacts module 137 (sometimes called an address book or contact list);
  telephone module 138;
  video conferencing module 139;
  e-mail client module 140;
  instant messaging (IM) module 141;
  workout support module 142;
  camera module 143 for still and/or video images;
  image management module 144;
  browser module 147;
  calendar module 148;
  widget modules 149, which may include one or more of: weather widget 149-1, stocks widget 149-2, calculator widget 149-3, alarm clock widget 149-4, dictionary widget 149-5, and other widgets obtained by the user, as well as user-created widgets 149-6;
  widget creator module 150 for making user-created widgets 149-6;
  search module 151;
  video and music player/editor module 152, which may be made up of a video player/editor module and a music player/editor module;
  notes module 153;
  map module 154; and/or
  online video module 155.

Examples of other applications 136 that may be stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact module 130, graphics module 132, and text input module 134, contacts module 137 may be used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference 139, e-mail 140, or IM 141; and so forth.

In conjunction with RF circuitry 108, audio circuitry 110, speaker 111, microphone 113, touch screen 112, display controller 156, contact module 130, graphics module 132, and text input module 134, telephone module 138 may be used to enter a sequence of characters corresponding to a telephone number, access one or more telephone numbers in address book 137, modify a telephone number that has been entered, dial a respective telephone number, conduct a conversation and disconnect or hang up when the conversation is completed. As noted above, the wireless communication may use any of a plurality of communications standards, protocols and technologies.

In conjunction with RF circuitry 108, audio circuitry 110, speaker 111, microphone 113, touch screen 112, display controller 156, optical sensor 164, optical sensor controller 158, contact module 130, graphics module 132, text input module 134, contact list 137, and telephone module 138, videoconferencing module 139 includes executable instructions to initiate, conduct, and terminate a video conference between a user and one or more other participants in accordance with user instructions.

In conjunction with RF circuitry 108, touch screen 112, display controller 156, contact module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages and to view received instant messages. In some embodiments, transmitted and/or received instant messages may include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact module 130, graphics module 132, text input module 134, GPS module 135, map module 154, and music player module 146, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store and transmit workout data.

In conjunction with touch screen 112, display controller 156, optical sensor(s) 164, optical sensor controller 158, contact module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display system controller 156, contact module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display system controller 156, contact module 130, graphics module 132, text input module 134, e-mail client module 140, and browser module 147, calendar module 148 includes executable instructions to create, display, modify, and store calendars and data associated with calendars (e.g., calendar entries, to do lists, etc.) in accordance with user instructions.

In conjunction with RF circuitry 108, touch screen 112, display system controller 156, contact module 130, graphics module 132, text input module 134, and browser module 147, widget modules 149 are mini-applications that may be downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display system controller 156, contact module 130, graphics module 132, text input module 134, and browser module 147, the widget creator module 150 may be used by a user to create widgets (e.g., turning a user-specified portion of a web page into a widget).

In conjunction with touch screen 112, display system controller 156, contact module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display system controller 156, contact module 130, graphics module 132, audio circuitry 110, speaker 111, RF circuitry 108, and browser module 147, video and music player/editor module 152 includes executable instructions that allow the user to download, play back, and/or edit recorded music and other sound files stored in one or more file formats, such as MP3 or AAC files, and executable instructions to display, play back, and/or edit videos (e.g., on touch screen 112 or on an external, connected display via external port 124). In some embodiments, device 100 may include the functionality of an MP3 player, such as an iPod (trademark of Apple Inc.).

In conjunction with touch screen 112, display controller 156, contact module 130, graphics module 132, and text input module 134, notes module 153 includes executable instructions to create and manage notes, to do lists, and the like in accordance with user instructions.

In conjunction with RF circuitry 108, touch screen 112, display system controller 156, contact module 130, graphics module 132, text input module 134, GPS module 135, and browser module 147, map module 154 may be used to receive, display, modify, and store maps and data associated with maps (e.g., driving directions; data on stores and other points of interest at or near a particular location; and other location-based data) in accordance with user instructions.

In conjunction with touch screen 112, display system controller 156, contact module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules may be combined or otherwise re-arranged in various embodiments. In some embodiments, memory 102 may store a subset of the modules and data structures identified above. Furthermore, memory 102 may store additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 may be reduced.

The predefined set of functions that may be performed exclusively through a touch screen and/or a touchpad include navigation between user interfaces. In some embodiments, the touchpad, when touched by the user, navigates device 100 to a main, home, or root menu from any user interface that may be displayed on device 100. In such embodiments, the touchpad may be referred to as a "menu button." In some other embodiments, the menu button may be a physical push button or other physical input control device instead of a touchpad.

Figure 1B:
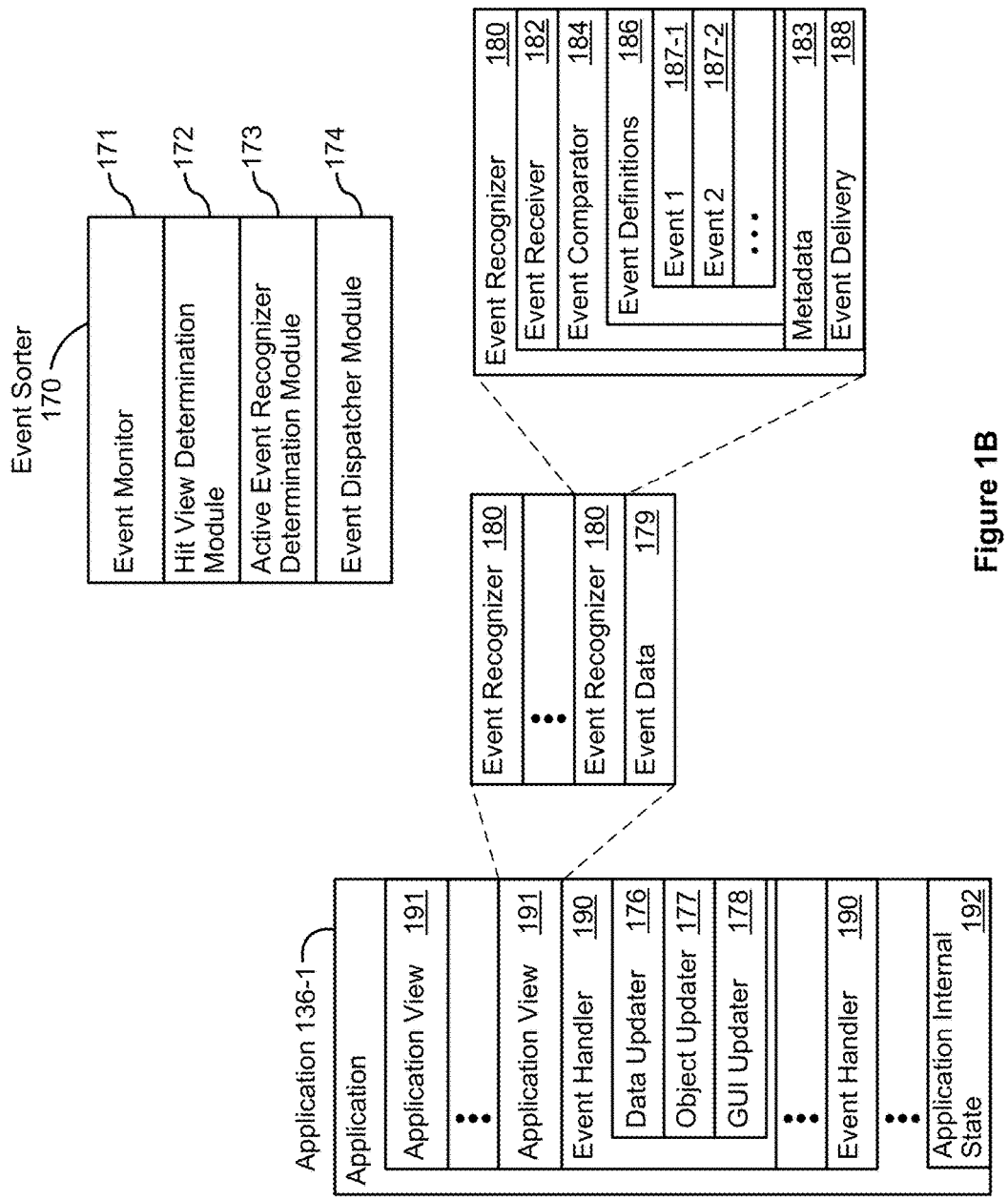
FIG. 1B is a block diagram illustrating exemplary components for event handling in accordance with some embodiments.

FIG. 1B is a block diagram illustrating exemplary components for event handling in accordance with some embodiments. In some embodiments, memory 102 (in FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripheral interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views, when touch sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected may correspond to programmatic levels within a programmatic or view hierarchy of the application. For example, the lowest level view in which a touch is detected may be called the hit view, and the set of events that are recognized as proper inputs may be determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (i.e., the first sub-event in the sequence of sub-events that form an event or potential event). Once the hit view is identified by the hit view determination module, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver module 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 may utilize or call data updater 176, object updater 177 or GUI updater 178 to update the application internal state 192. Alternatively, one or more of the application views 191 includes one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170, and identifies an event from the event information. Event recognizer 180 includes event receiver 182 and event comparator 184. In some embodiments, event recognizer 180 also includes at least a subset of: metadata 183, and event delivery instructions 188 (which may include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch the event information may also include speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event 187 include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first lift-off (touch end) for a predetermined phase, a second touch (touch begin) on the displayed object for a predetermined phase, and a second lift-off (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and lift-off of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event 187 also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers may interact with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module 145. In some embodiments, object updater 177 creates and updates objects used in application 136-1. For example, object updater 176 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input-devices, not all of which are initiated on touch screens, e.g., coordinating mouse movement and mouse button presses with or without single or multiple keyboard presses or holds, user movements taps, drags, scrolls, etc., on touch-pads, pen stylus inputs, movement of the device, oral instructions, detected eye movements, biometric inputs, and/or any combination thereof, which may be utilized as inputs corresponding to sub-events which define an event to be recognized.

Figure 2:
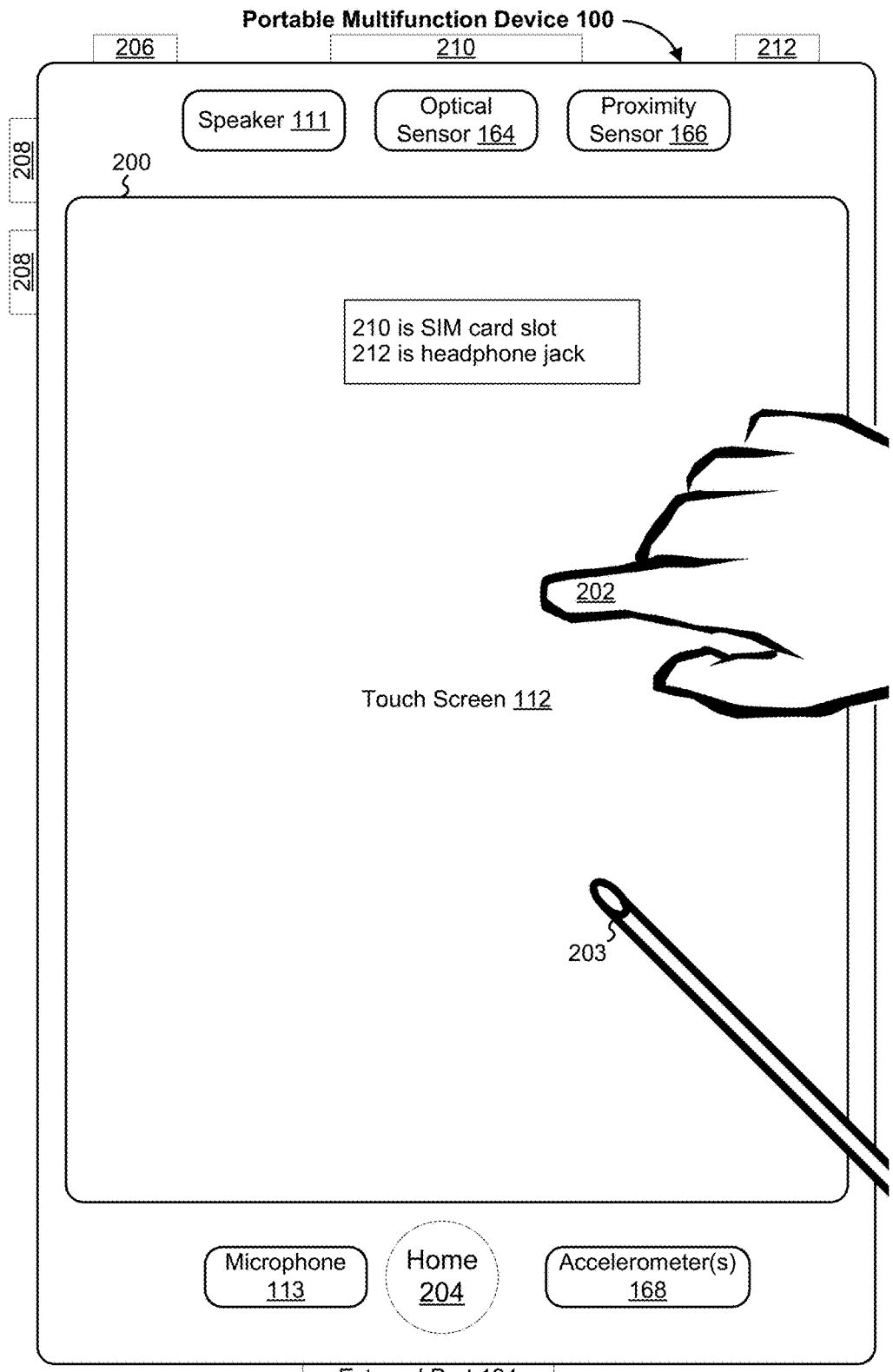
FIG. 2 illustrates a portable multifunction device having a touch screen in accordance with some embodiments.

FIG. 2 illustrates a portable multifunction device 100 having a touch screen 112 in accordance with some embodiments. The touch screen may display one or more graphics within user interface (UI) 200. In this embodiment, as well as others described below, a user may select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture may include one or more taps, one or more swipes (from left to right, right to left, upward and/or downward) and/or a rolling of a finger (from right to left, left to right, upward and/or downward) that has made contact with device 100. In some embodiments, inadvertent contact with a graphic may not select the graphic. For example, a swipe gesture that sweeps over an application icon may not select the corresponding application when the gesture corresponding to selection is a tap.

Device 100 may also include one or more physical buttons, such as "home" or menu button 204. As described previously, menu button 204 may be used to navigate to any application 136 in a set of applications that may be executed on device 100. Alternatively, in some embodiments, the menu button is implemented as a soft key in a GUI displayed on touch screen 112.

In one embodiment, device 100 includes touch screen 112, menu button 204, push button 206 for powering the device on/off and locking the device, volume adjustment button(s) 208, Subscriber Identity Module (SIM) card slot 210, head set jack 212, and docking/charging external port 124. Push button 206 may be used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also may accept verbal input for activation or deactivation of some functions through microphone 113.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPU's) 310, one or more network or other communications interfaces 360, memory 370, and one or more communication buses 320 for interconnecting these components. Communication buses 320 may include circuitry (sometimes called a chipset) that interconnects and controls communications between system components. Device 300 includes input/output (I/O) interface 330 comprising display 340, which is typically a touch screen display. I/O interface 330 also may include a keyboard and/or mouse (or other pointing device) 350 and touchpad 355. Memory 370 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 370 may optionally include one or more storage devices remotely located from CPU(s) 310. In some embodiments, memory 370 stores programs, modules, and data structures analogous to the programs, modules, and data structures stored in memory 102 of portable multifunction device 100 (FIG. 1), or a subset thereof. Furthermore, memory 370 may store additional programs, modules, and data structures not present in memory 102 of portable multifunction device 100. For example, memory 370 of device 300 may store drawing module 380, presentation module 382, word processing module 384, website creation module 386, disk authoring module 388, and/or spreadsheet module 390, while memory 102 of portable multifunction device 100 (FIG. 1) may not store these modules.

Each of the above identified elements in FIG. 3 may be stored in one or more of the previously mentioned memory devices. Each of the above identified modules corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 370 may store a subset of the modules and data structures identified above. Furthermore, memory 370 may store additional modules and data structures not described above.

Attention is now directed towards embodiments of user interfaces ("UI") that may be implemented on portable multifunction device 100.

Figure 4A:
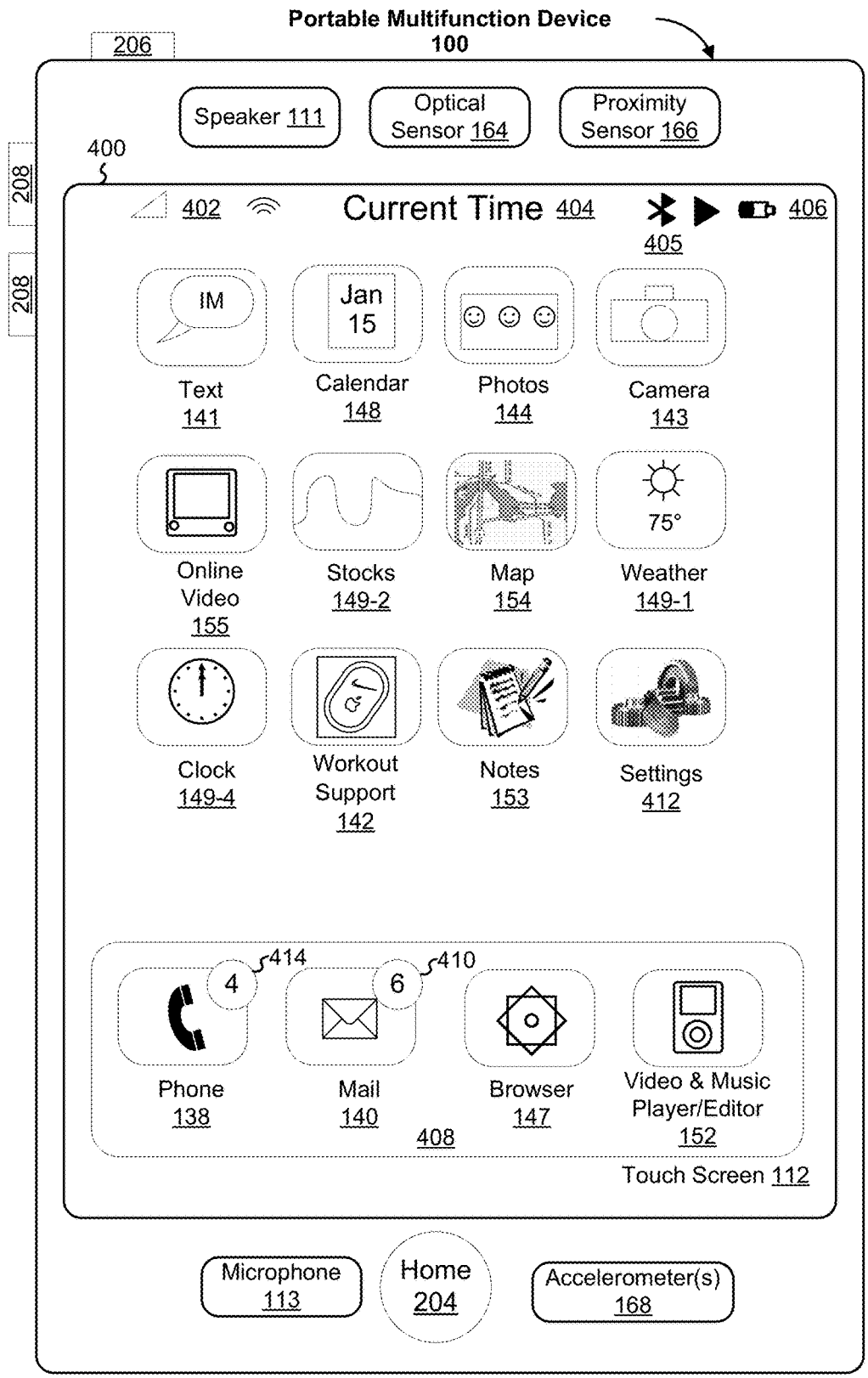
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces may be implemented on device 300. In some embodiments, user interface 400 includes the following elements, or a subset or superset thereof:

Signal strength indicator(s) 402 for wireless communication(s), such as cellular and Wi-Fi signals;
Time 404;
Bluetooth indicator 405;
Battery status indicator 406;
Tray 408 with icons for frequently used applications, such as:
  Phone 138, which may include an indicator 414 of the number of missed calls or voicemail messages;
  E-mail client 140, which may include an indicator 410 of the number of unread e-mails;
  Browser 147; and
  Video and music player/editor 152; and
Icons for other applications, such as:
  IM 141;
  Image management 144;
  Camera 143;
  Weather 149-1;
  Stocks 149-2;
  Workout support 142;
  Calendar 148;
  Alarm clock 149-4;
  Map 154;
  Notes 153;
  Settings 412, which provides access to settings for device 100 and its various applications 136; and
  Online video module 155, also referred to as YouTube (trademark of Google Inc.) module 155.

Figure 4B:
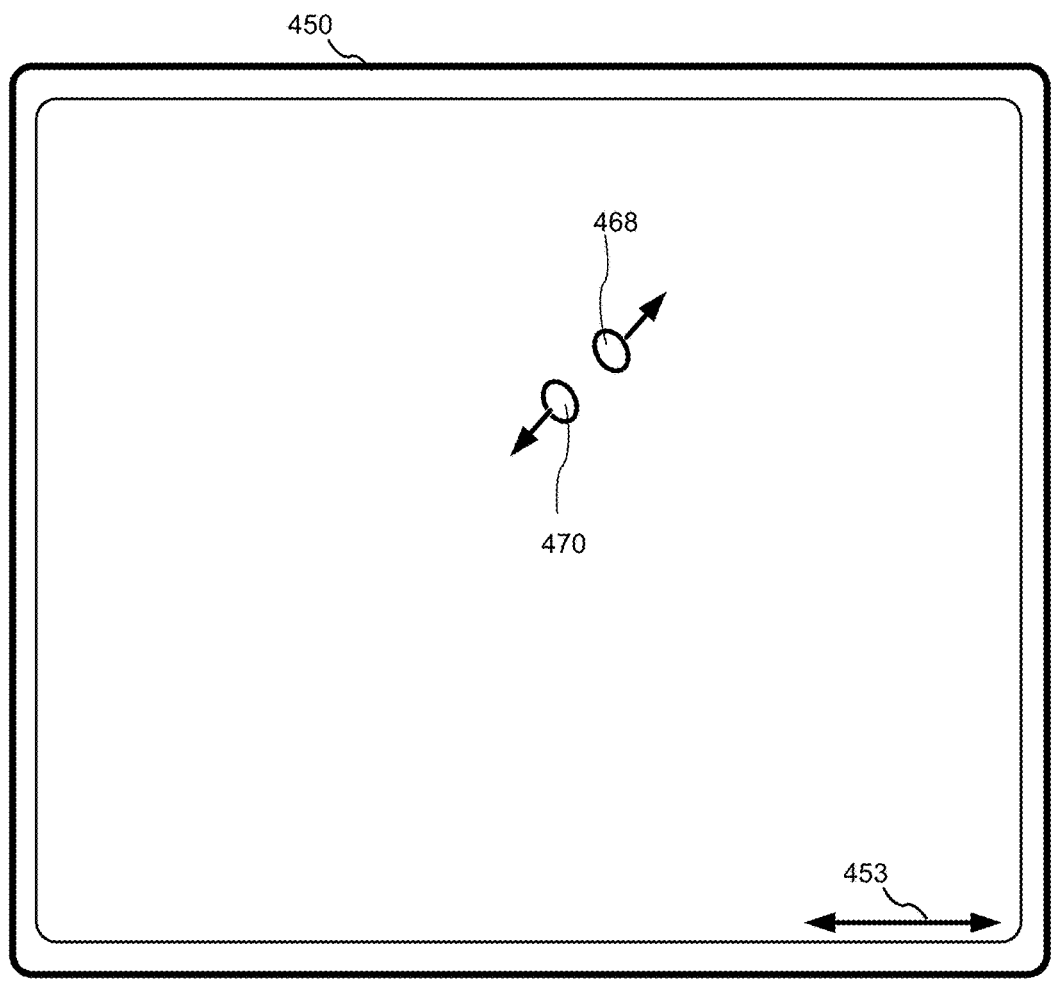
FIG. 4B illustrates an exemplary user interface for a multifunction device with a touch-sensitive surface that is separate from the display in accordance with some embodiments.
Figure 4B:
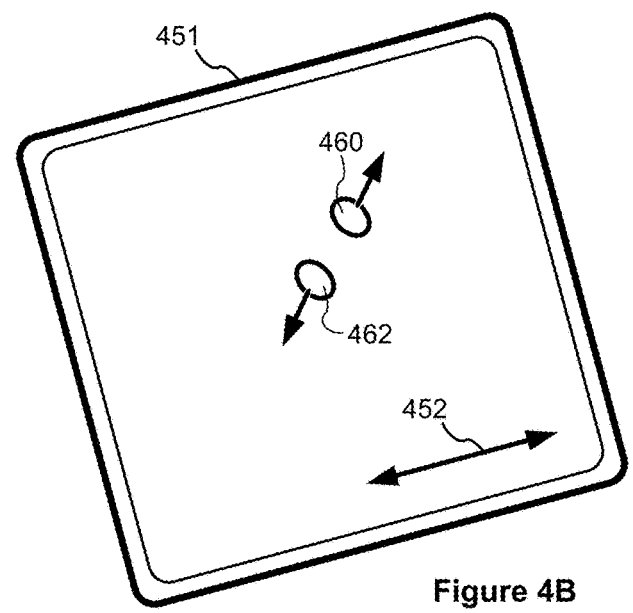

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). In some embodiments the touch sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods may be used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse based input or stylus input). For example, a swipe gesture may be replaced with a mouse click (e.g., instead of a contact) followed by movement of the cursor along the path of the swipe (e.g., instead of movement of the contact). As another example, a tap gesture may be replaced with a mouse click while the cursor is located over the location of the tap gesture (e.g., instead of detection of the contact followed by ceasing to detect the contact). Similarly, when multiple user inputs are simultaneously detected, it should be understood that multiple computer mice may be used simultaneously, or a mouse and finger contacts may be used simultaneously.

User Interfaces and Associated Processes

Attention is now directed towards embodiments of user interfaces ("UI") and associated processes that may be implemented on an electronic device with a display and a touch-sensitive surface, such as device 300 or portable multifunction device 100.

FIGS. 5A-5I illustrate exemplary user interfaces for editing videos in accordance with some embodiments. The user interfaces in these figures are used to illustrate the processes described below, including the processes in FIGS. 6A-6B.

Figure 5A:
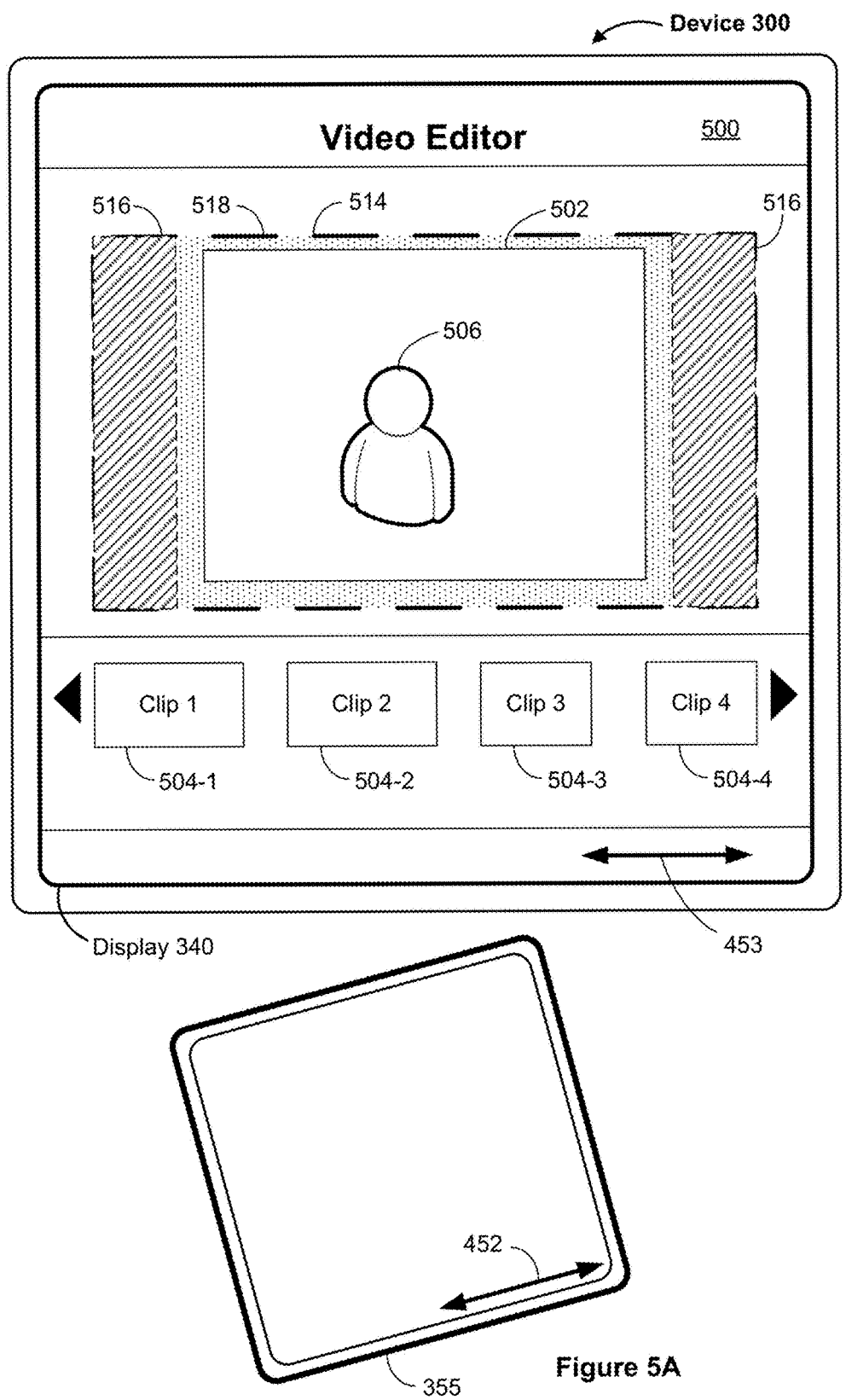
FIGS. 5A-5I illustrate exemplary user interfaces for editing videos in accordance with some embodiments.
Figure 6A:
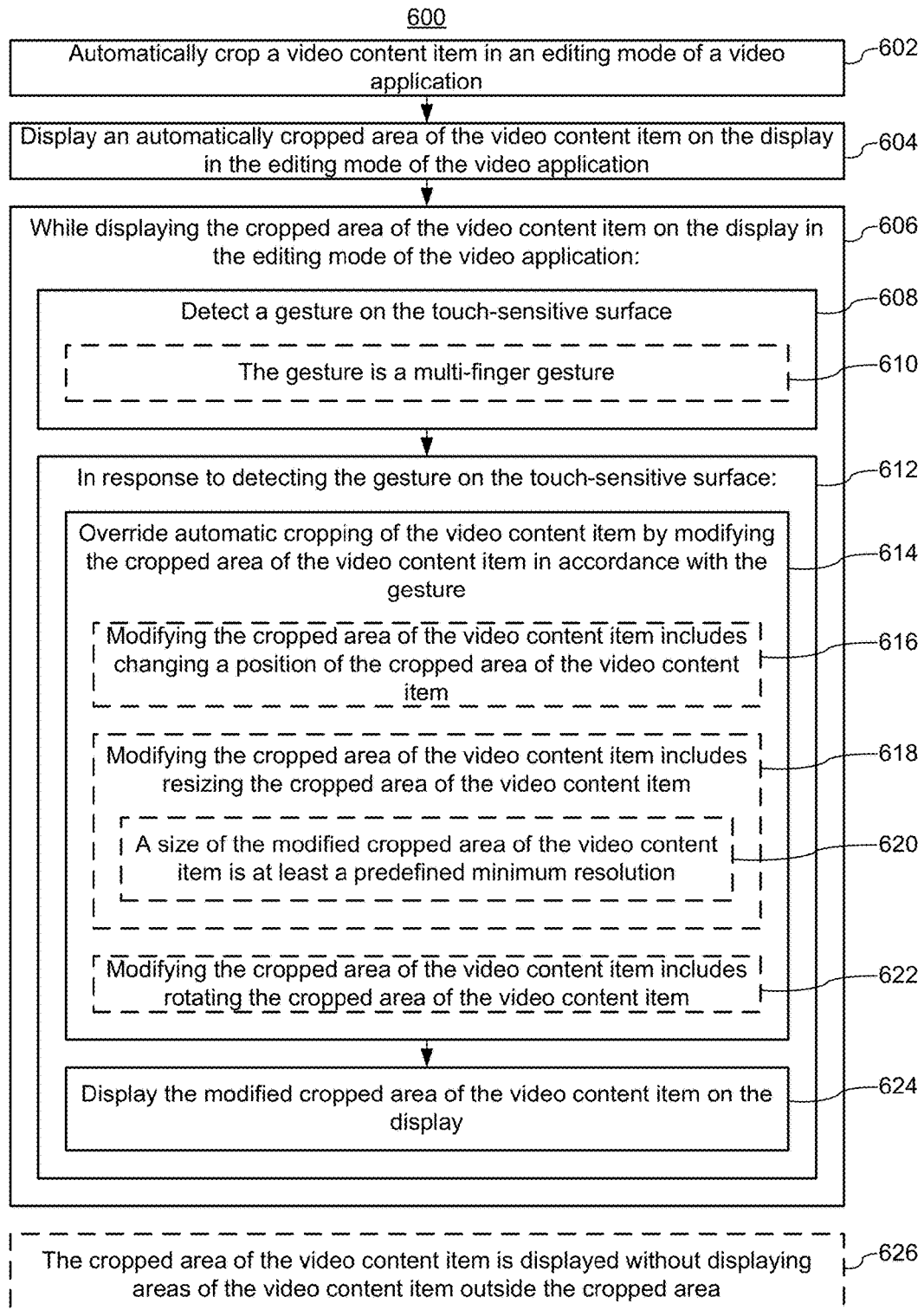
FIGS. 6A-6B are flow diagrams illustrating a method of editing videos in accordance with some embodiments.
Figure 6B:
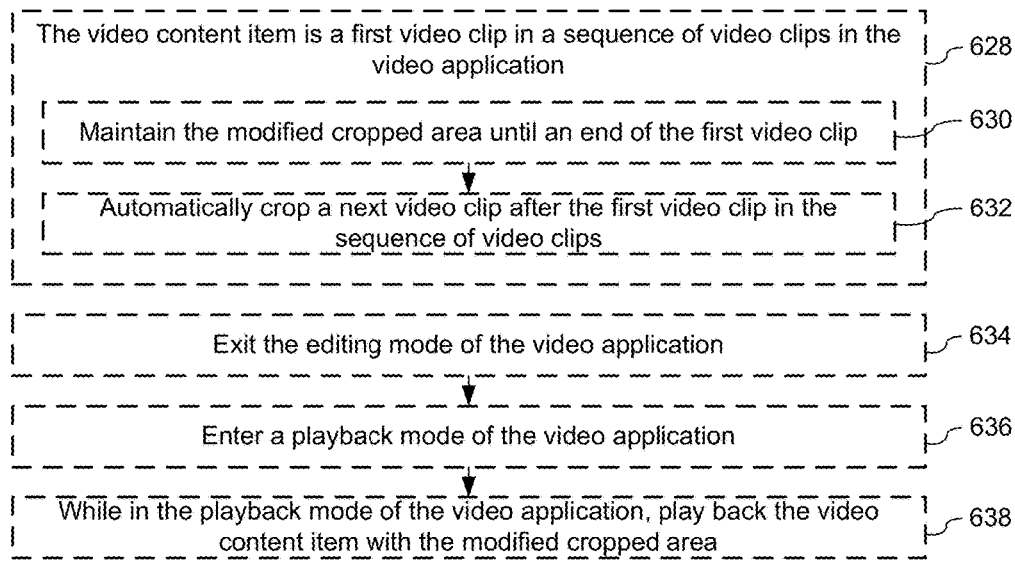

FIG. 5A depicts a video editor interface 500 displayed on display 340 of device 300. In some embodiments, video editor interface 500 may be displayed as an interface of a video application (e.g., QuickTime Player from Apple Inc. of Cupertino, Calif.) while in editing mode. Device 300 also includes touchpad 355, which may be used to interact with video editor interface 500 in an analogous manner as with touch-sensitive surface 451 described above with reference to FIG. 4B. It should be appreciated that the description below may be applied to embodiments where video editor interface 500 is displayed on touch screen 112 of device 100 and gestures performed on touchpad 355 are performed on touch screen 112.

Video editor interface 500 includes video 502 being edited by the user. Video 502 may be made up of one or more video clips, hereinafter referred to as "Clips." For example, video 502 includes Clips 1 thru 4 in sequence. Video editor interface 500 includes video clip previews 504 corresponding to the video clips in video 502. For example, clip preview 504-1 corresponds to Clip 1 and shows a frame from Clip 1; clip preview 504-2 corresponds to Clip 2 and shows a frame from Clip 2; and so on. In some embodiments, clip previews 504 are displayed in a timeline sequence corresponding to the order of the corresponding Clips in video 502. If there are more clip previews 504 than can be displayed at once, the user may scroll through the sequence of clip previews 504 to see more clip previews 504 corresponding to video clips in video 502. In some embodiments, the user may select a clip preview 504 (e.g., by a tap gesture on a touch screen, mouse click, or similar input) to open the corresponding video clip for playback and/or editing.

In some embodiments, Clips 1 thru 4 are added to video 502 in accordance with user inputs. The user inputs may include, for example, selecting a clip to become video 502 in its initial incarnation (i.e., the selected clip is the initial clip in video 502, to which a user adds additional clips), dragging a representation of a Clip into video 502 in video editor interface 500, selecting a menu option to add a Clip into video 502, and so on.

Video 502 has a video resolution (e.g., 640×480) and an aspect ratio (e.g., 4:3). In some embodiments, the video resolution and aspect ratio of video 502 is set to the same video resolution and aspect ratio as the initial clip in video 502. In some other embodiments, the video resolution and aspect ratio of video 502 is specified by a user when video 502 is first generated.

A video clip that is added to video 502 may have a different resolution and/or aspect ratio than video 502 (e.g., a different resolution and/or aspect ratio than the initial clip in video 502, with the initial clip setting the resolution and/or aspect ratio for video 502). In some embodiments, a video clip that has a different resolution and/or aspect ratio different than video 502 is automatically modified to conform to the resolution and aspect ratio of video 502. The modification may include scaling and/or cropping. For example, FIG. 5A illustrates video area 514 corresponding to Clip 2. Clip 2 has a larger video resolution and a different aspect ratio than video 502, as shown by video 502 overlaid on video area 514. For example, for purposes of description, it is assumed below that, unless otherwise specified, video 502 has a 640×480 resolution and a 4:3 aspect ratio (e.g., the resolution and aspect ratio of Clip 1, the initial clip in video 502), and Clip 2 has a 1280×720 resolution and a 16:9 aspect ratio.

When Clip 2 is added to video 502, Clip 2 is automatically scaled and/or cropped to conform to the resolution and aspect ratio of video 502. In some embodiments, the automatic scaling and/or cropping includes first cropping Clip 2 to yield a cropped video area in Clip 2 that matches the aspect ratio of video 502. For example, areas 516 (shaded with diagonal black and white lines in the figures) are removed from video area 514 to yield cropped video area 518 (shaded with light gray in the figures) that has a 960×720 resolution (preserving the height of video area 514) and a 4:3 aspect ratio. Cropped video area 518 has the same aspect ratio as video 502 but not necessarily the same resolution. The resolution of cropped video 518 may be scaled to conform to the resolution of video 502. For example, the resolution of cropped video area 518 may be changed from 960×720 to 640×480. The result is that video 502 includes a portion of video area 514, as defined by cropped video area 518, which includes person 506 that is depicted in a frame in Clip 2. In this modification, content at the top and bottom of video area 514 is preserved in cropped video area 518 at the expense of some loss in video quality due to changing the resolution of cropped video area 518 from 960×720 to 640×480.

An alternative automatic modification strategy may be cropping video area 514 to a 640×480, 4:3 cropped area without any resolution scaling. That is, video area 514 is cropped to an area that matches the dimensions and resolution of video 502 without any resolution scaling. In this case, more portions of video area 514 are cropped off.

In some circumstances, the automatic modification may include scaling and/or adding pixels (e.g., adding letterboxing, pillarboxing, windowboxing). For example, if video 502 is instead a 16:9 video and Clip 2 is instead a 4:3 video with the same pixel height as video 502, Clip 2 may be modified to conform to video 502 by adding pillarboxing to make up the difference in pixel width.

In some embodiments, the automatic modification that is used depends on whether a clip mismatches video 502 in resolution (dimensions), aspect ratio, or both. For example, if both the aspect ratio and the dimensions (both height and width) differ between the clip and video 502, then the clip is cropped and scaled. If both dimensions differ between the clip and video 502 but the aspect ratios match, the clip is scaled. If the aspect ratios differ, but the clip and video 502 match in one dimension, the clip is cropped.

In some embodiments, the user may specify preferences regarding criteria for choice of automatic modification strategies that device 300 elects to deploy. For example, the user may specify a preference for quality preservation, as opposed to content preservation, and this preference affects which strategies device 300 deploys. In some embodiments, this preference may be expressed in a sliding scale.

In some embodiments, the automatic modification is smart. That is, the modification is performed to preserve objects of interest (e.g., person 506, objects, etc.) in the video clip, as well as to conform the resolution and aspect ratio. Further details about automatic and smart modification of videos to conform resolutions and aspect ratios are disclosed in U.S. patent application Ser. No. 13/016,930, titled "Smart Scaling and Cropping," filed Jan. 28, 2011, which is incorporated by reference herein in its entirety.

It should be appreciated that, in the figures, video area 514, removed areas 516, and cropped video area 518 (which are illustrated in the figures as overlaid with video 502) are not actually displayed to the user in video editor interface 500. They are included in the figures with video 502 overlaid on them merely to help describe the cropping modifications to video area 514. The result of the modifications to video area 514 is displayed to the user in video 502. This should not be read to preclude the displaying of video area 514, removed areas 516, and cropped video area 518 elsewhere in video editor interface 500. Further, it should be appreciated that video 502, video area 514, removed areas 516, and cropped video area 518 are not necessarily drawn to scale.

Figure 5B:
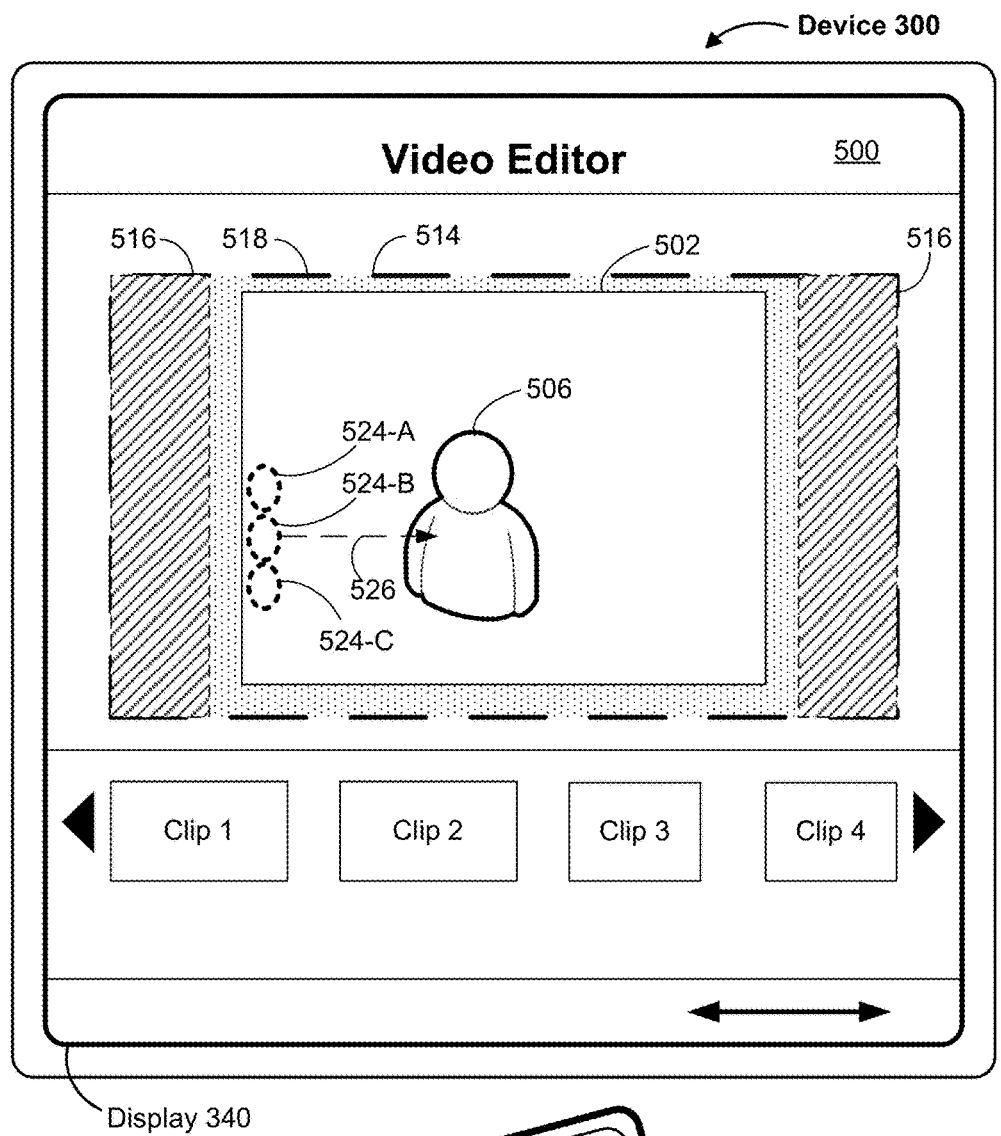
Figure 5B:
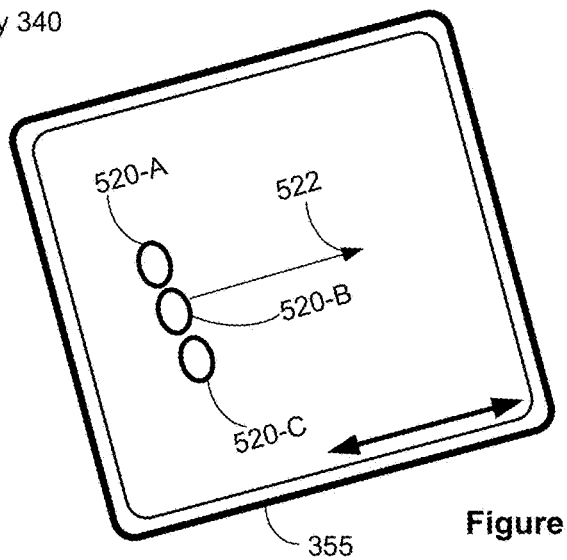

A user who is not satisfied with the result of the automatic modification of a video may override the automatic modification by performing particular gestures. One way to override the automatic modification is by repositioning the cropped video area. FIG. 5B depicts gesture 520 being detected on touchpad 355. Gesture 520 includes finger contacts 520-A thru 520-C moving in direction 522. Gesture 520 corresponds to interaction 524, moving in direction 526, with video 502. In some embodiments, gesture 520 is a flicking or swiping gesture. In some other embodiments, gesture 520 is a dragging gesture.

Figure 5C:
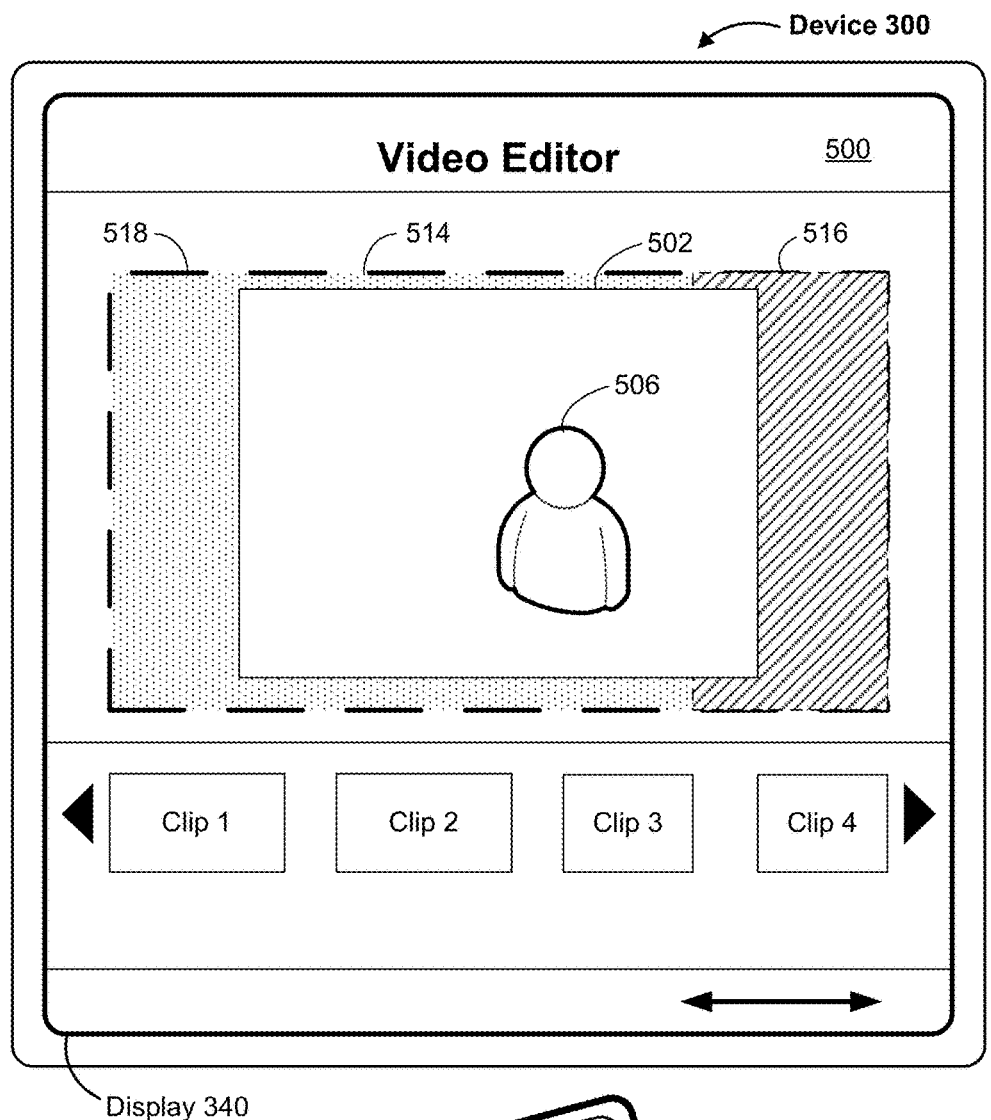
Figure 5C:
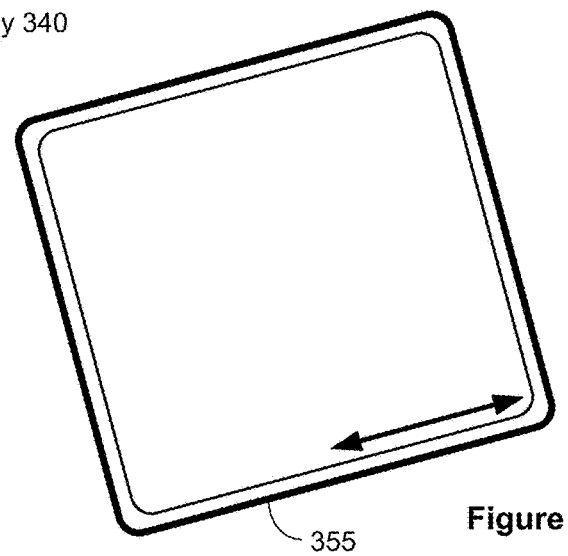

In response to detection of gesture 520, cropped video area 518 becomes left-justified within video area 514, as shown in FIG. 5C. In other words, rather than, say, removing equal parts from the left and right sides of video area 514 to automatically generate cropped video area 518, an area is removed just from the right side of video area 514. The user perceives the result of the override as the view in video Clip 2, for the same frame, moved leftward, as if the movie camera moved leftward, resulting in objects of interest from Clip 2 (e.g., person 506) that are in video 502 being perceived as shifted rightward compared to the result of the automatic modification (e.g., the frame as depicted in FIG. 5C compared to the same frame as depicted in FIG. 5A).

In some embodiments, gesture 520 is a flick or swipe gesture; the user may flick or swipe in a direction to justify cropped video area 518 to the left, to the right, to the top, to the bottom, to a corner, or to the center of video area 514 in accordance with the direction of the flick or swipe. In some embodiments, gesture 520 may be a dragging gesture; the user may pan video 502 in any direction using the dragging gesture, as if dragging cropped video area 518 within video area 514 to reposition cropped video area 518 within video area 514.

Figure 5D:
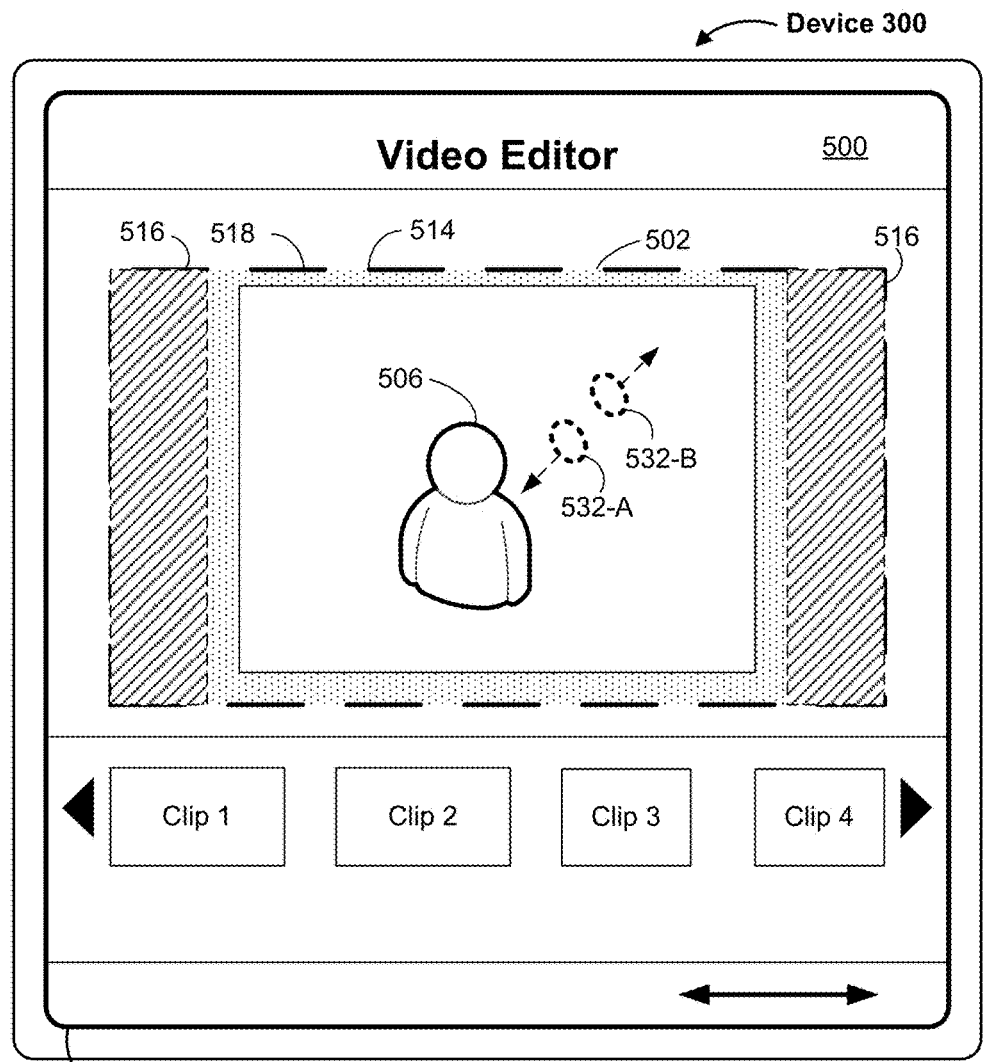
Figure 5D:
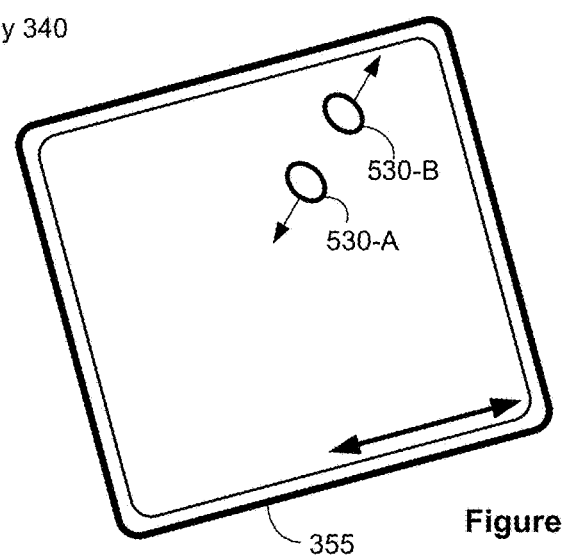

Another way to override the automatic modification is by resizing the cropped video area. FIG. 5D depicts, continuing from FIG. 5A, gesture 530 being performed on touchpad 355. Gesture 530 includes finger contacts 530-A and 530-B moving apart in a depinch gesture. Gesture 530 corresponds to interaction 532 on video 502.

Figure 5E:
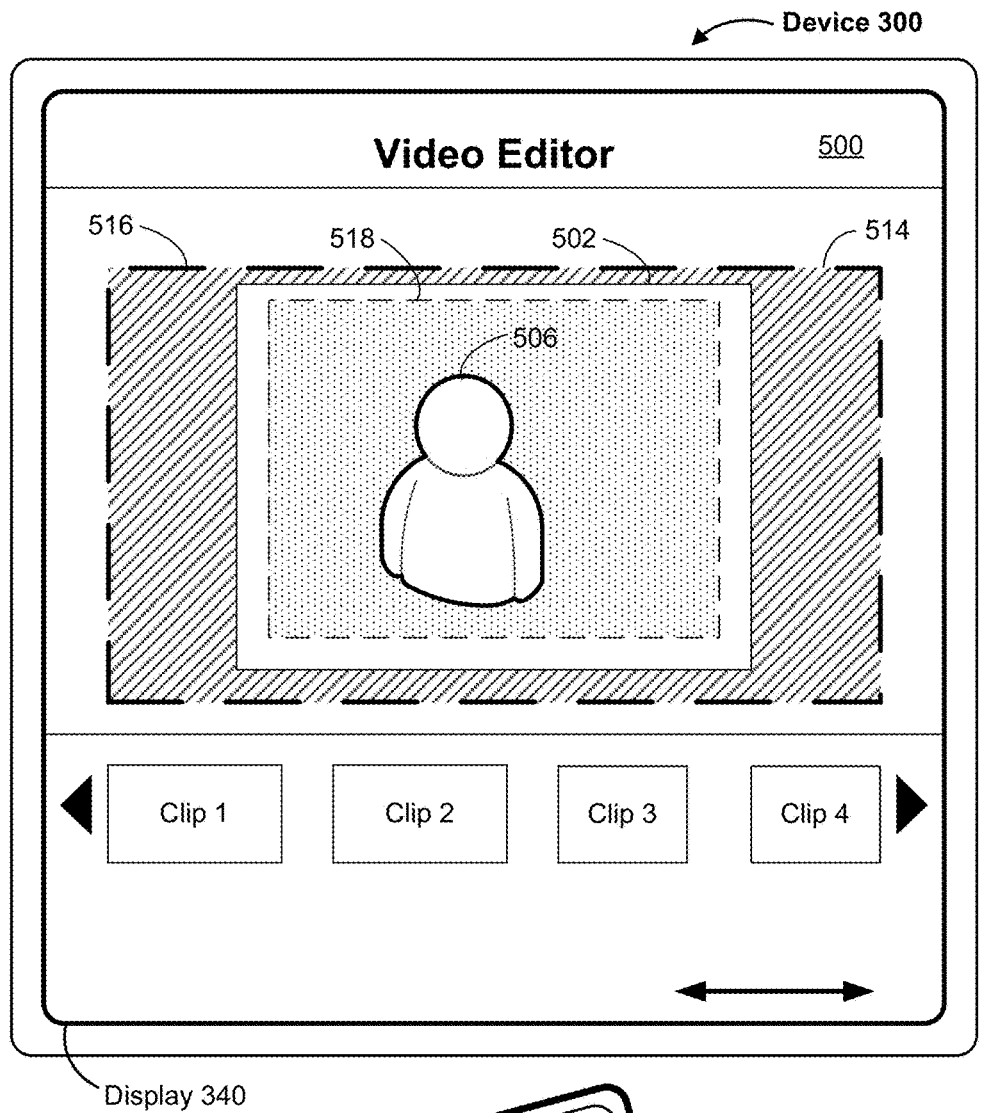
Figure 5E:
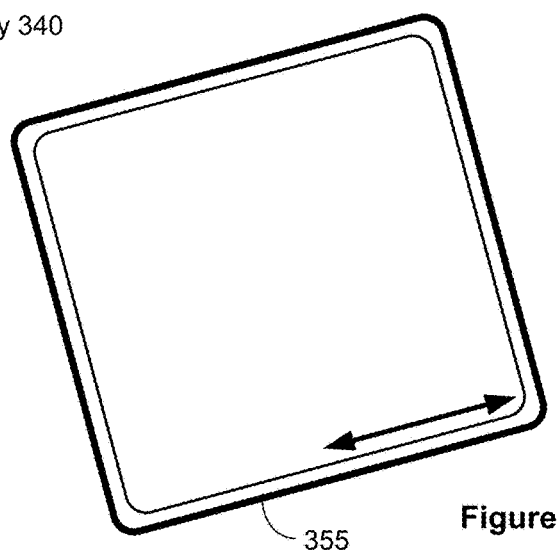

In response to detection of gesture 530, video 502 is zoomed in from the perspective of the user, as shown in FIG. 5E. In FIG. 5E, person 506 in Clip 2 is larger (i.e., zoomed in) compared to FIG. 5D. With respect to cropped video area 514 and video area 518, the effect of gesture 530 is that a larger area 516 is removed from video area 514, yielding a smaller cropped video area 518 than cropped video area 518 as depicted in FIG. 5D. The smaller cropped video area 518 requires less or no resolution scaling down to a smaller resolution (and may even require scaling up to a higher resolution and/or adding letterboxing/pillarboxing/windowboxing) to conform to the resolution of video 502. As a result, the smaller cropped video area 518, when displayed as part of video 502, appears, compared to automatically cropped video area 518 as shown in FIG. 5D, zoomed-in from the user's perspective.

FIG. 5D depicts a depinch gesture being detected on touchpad 355, and the result (smaller cropped video area 518) is depicted in FIG. 5E. Vice versa, a pinch gesture may be detected on touchpad 355. In response to detection of the pinch gesture on touchpad 355, cropped video area 518 is enlarged, making the portion of video 502 that includes cropped video area 518 look zoomed-out from the user's perspective.

FIGS. 5D and 5E above describe depinch gesture 530 that causes zooming in of video 502 from the user's perspective, by making cropped video area 518 smaller; the gesture corresponds to the direct manipulation effect expected on Clip 2 from the user's perspective, as opposed to an effect on cropped video area 518. Conversely, in some other embodiments, the gesture corresponds to direct manipulation of cropped video area 518. For example, a depinch gesture would enlarge cropped video area 518, and as a result zoom out on video 502 from the user's perspective. A pinch gesture would shrink cropped video area 518, and as a result zoom in on video 502 from the user's perspective.

In some embodiments, the size of cropped video area 518 as a result of automatic modification or manual resizing (overriding an automatic modification) is (at least prior to any scaling) a predefined minimum resolution. Such a minimum is set in order to ensure that the portion of video 502 that includes cropped video area 518 is not overly pixilated due to enlarging a video clip with a low resolution. In some embodiments, the minimum resolution is 640×480. In some other embodiments, the minimum resolution is a minimum relative to video 502. For example, the minimum resolution may be some multiple of the resolution of video 502.

In some embodiments, the amount of scaling of cropped video area 518 from one resolution to a larger resolution is restricted to a maximum level. This is also to ensure that the portion of video 502 that includes cropped video area 518 is not overly pixilated. In some embodiments, the maximum scaling is two times the original resolution (i.e., the resolution of cropped video area 518, after any cropping as needed, but prior to any scaling). This also effectively sets a minimum resolution for cropped video area 518 relative to video 502. For example, for video 502, the minimum resolution for cropped video area 518 is 320×240; a cropped video area 518 that is any smaller violates the maximum scaling of 2× the original resolution.

Figure 5F:
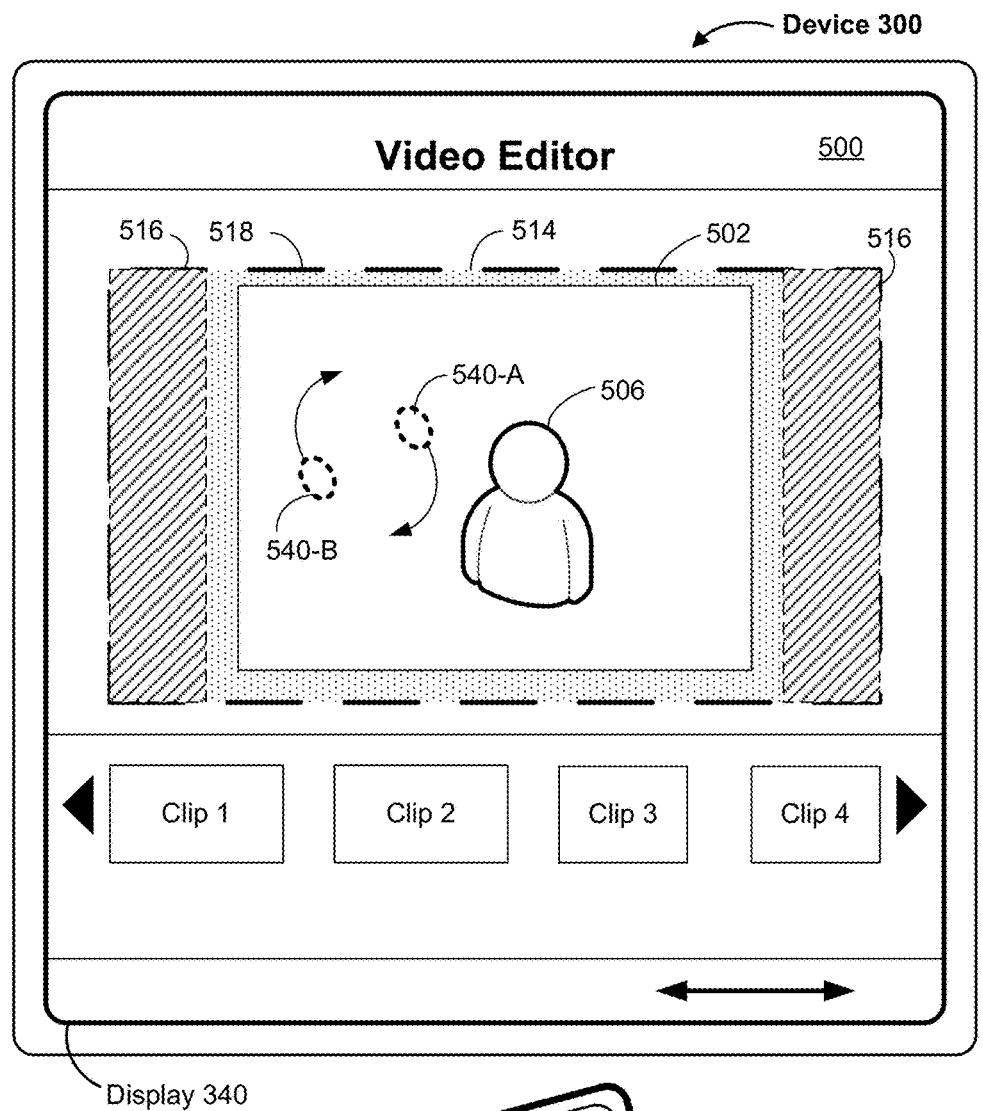
Figure 5F:
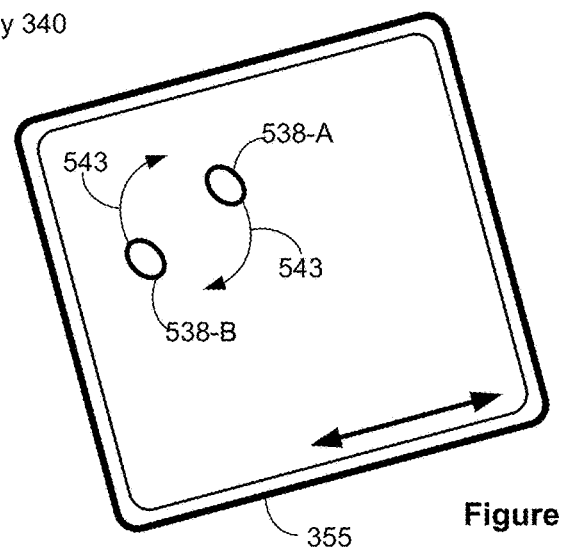

Yet another way to override the automatic modification is by rotating the cropped video area. FIG. 5F depicts, continuing from FIG. 5A, gesture 538 being performed on touchpad 355. Gesture 538 includes finger contacts 538-A and 538-B revolving around an axis perpendicular to the surface of touchpad 355 in rotational movements 543; gesture 538 is a rotation gesture. Gesture 538 corresponds to interaction 540 on video 502.

Figure 5G:
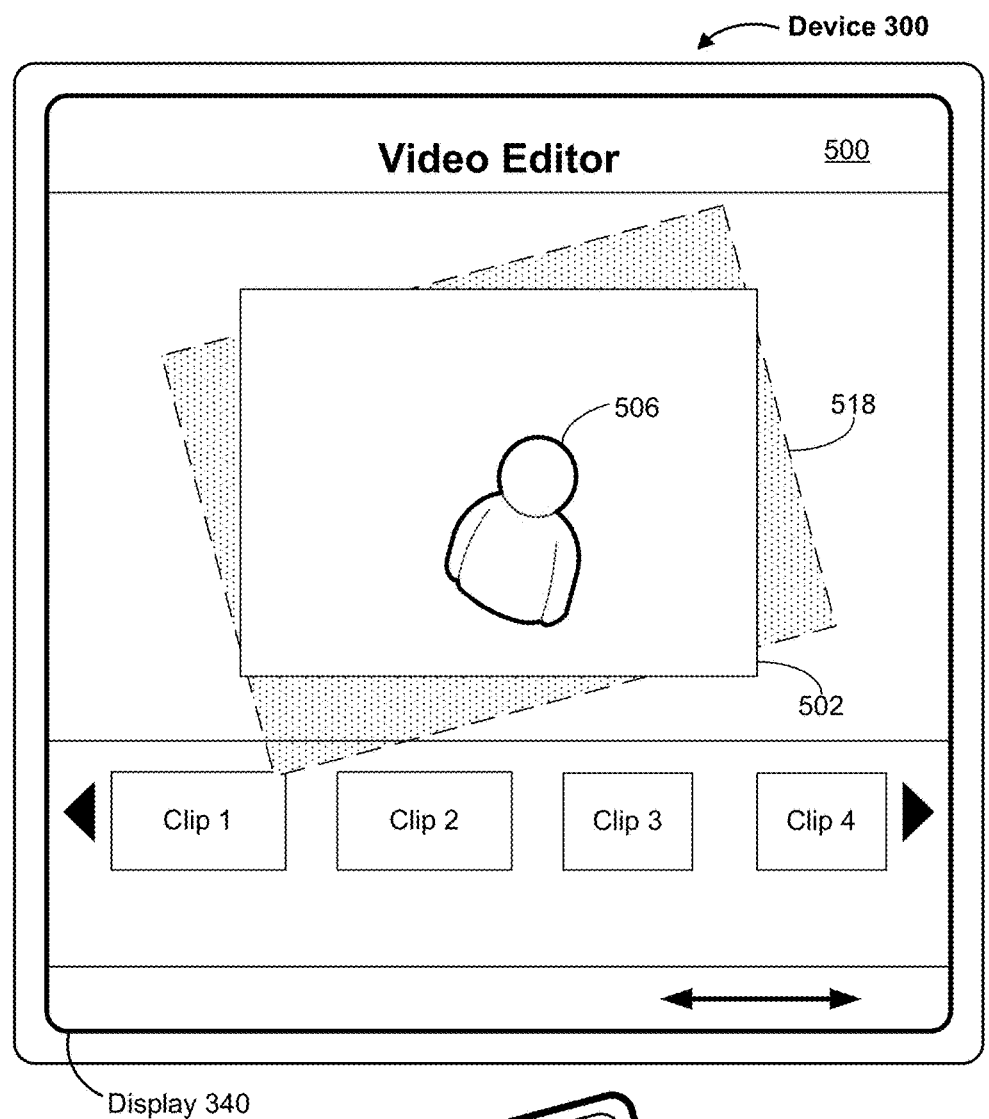
Figure 5G:
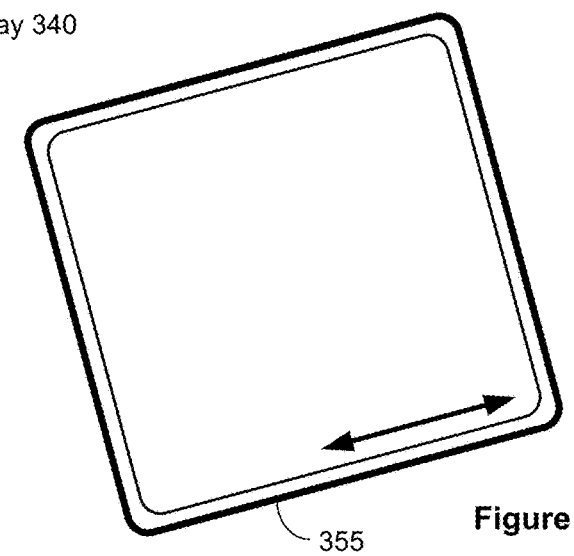

In response to detection of gesture 538, Cropped video area 518 is rotated, as shown in FIG. 5G. The rotated cropped video area 518 is reflected in video 502, where person 506 (and the view in the frame) is rotated also. In some embodiments, detection of gesture 538 causes rotation by a predefined amount, such as 90° to change the orientation of a Clip from a landscape orientation to a portrait orientation, or vice versa.

Figure 5H:
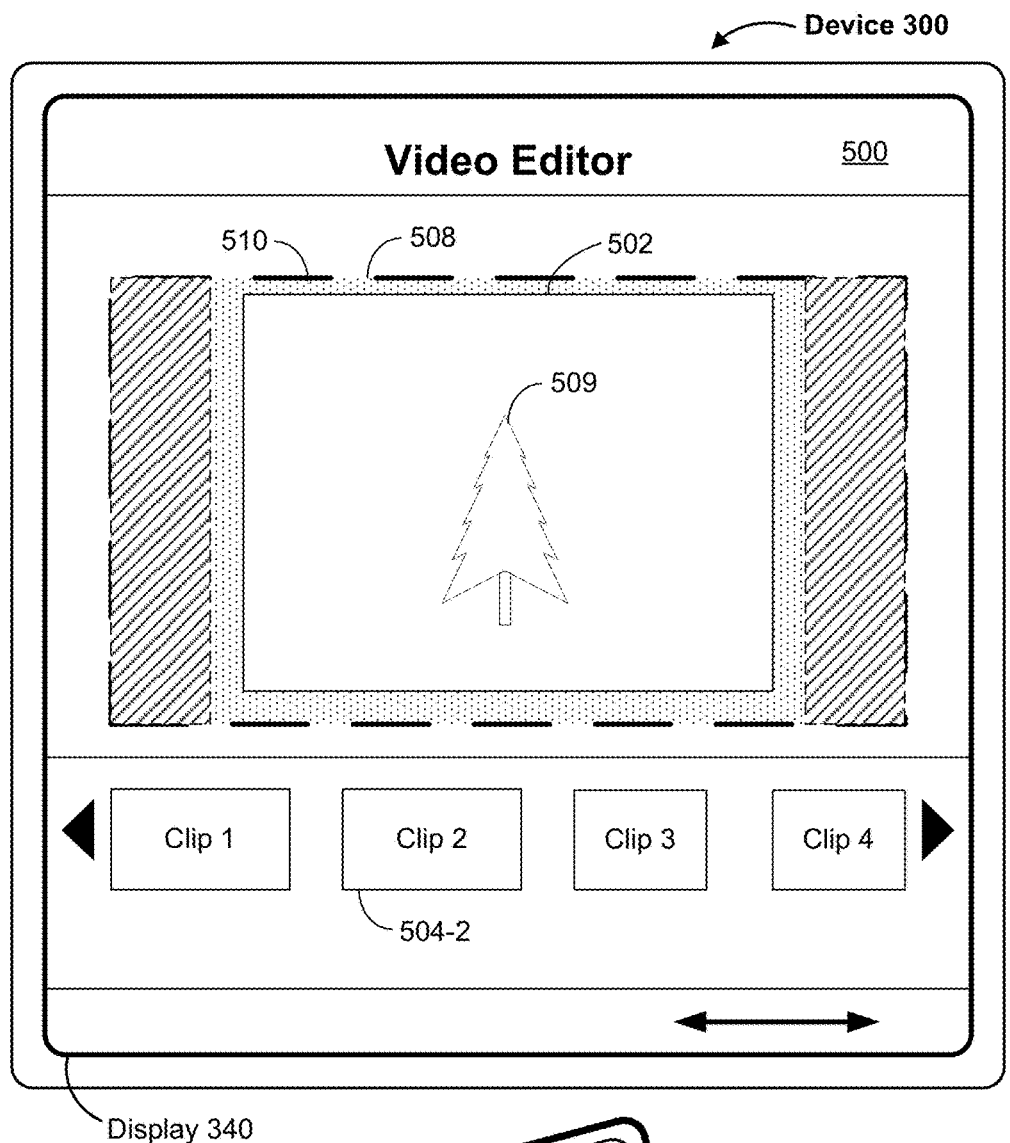
Figure 5H:
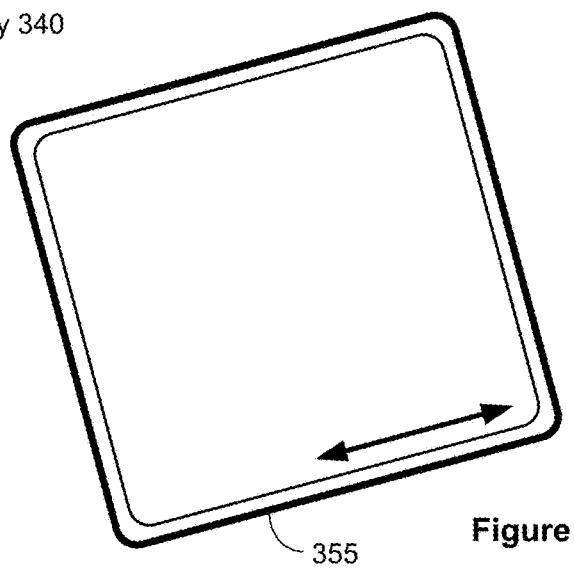

In some embodiments, the overriding of automatic modification for one clip in video 502 does not carry over to other clips in video 502. For example, continuing from FIG. 5G, FIG. 5H depicts video area 508 corresponding to Clip 3, with cropped video area 510. Tree 509 that is in Clip 3 is shown in video 502. The rotation of cropped video area 518 does not carry over to cropped video area 510; cropped video area 510 is not rotated, and neither is tree 509 in video 502.

Figure 5I:
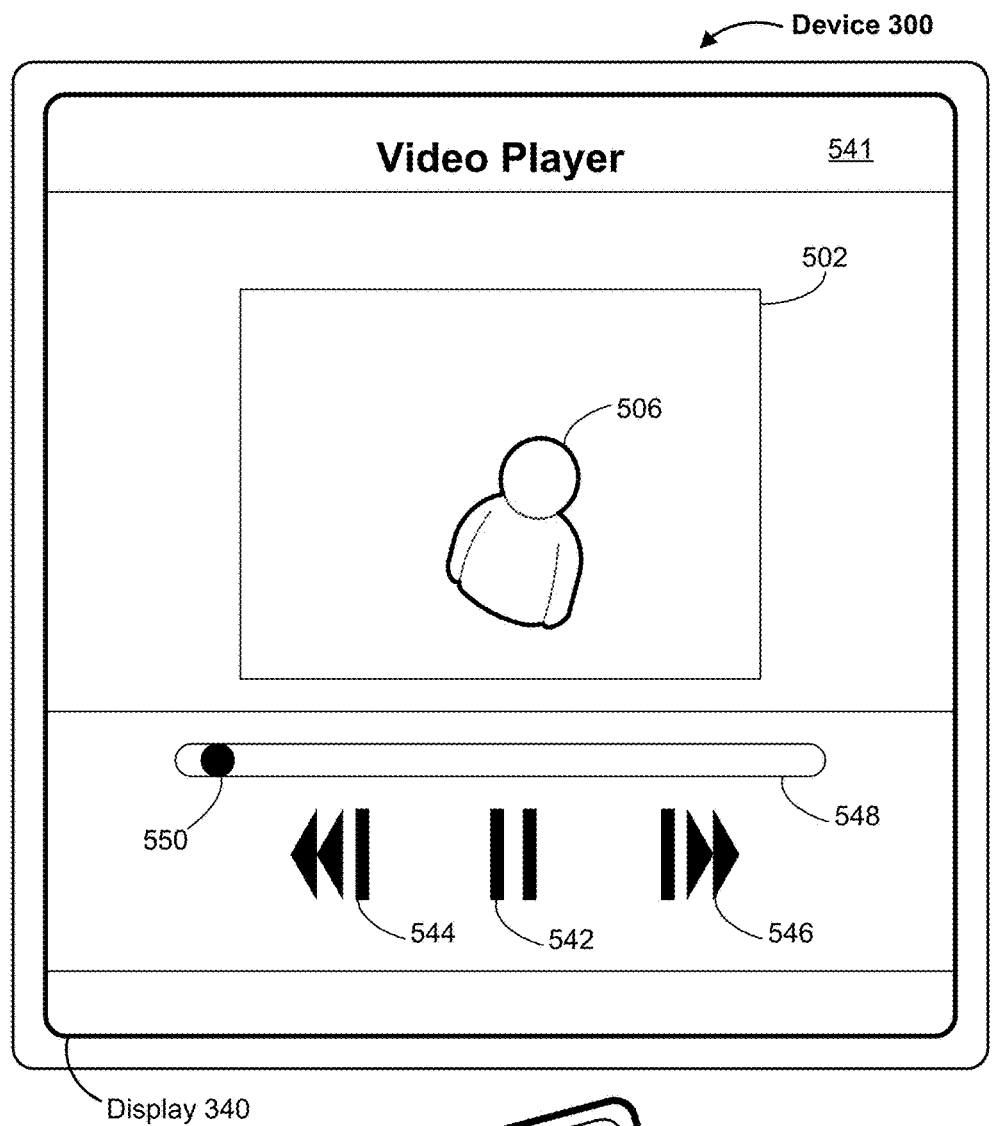
Figure 5I:
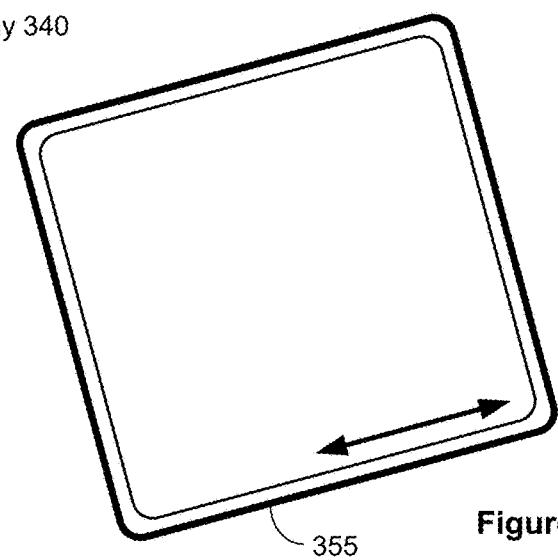

When automatic modification is overridden for a clip in video 502, and video 502 is saved with the override, video 502 with the override is displayed to the user when played outside of edit mode. For example, continuing from FIG. 5G, FIG. 5I depicts video 502 displayed in video player interface 541 of the video application while not in editing mode. In some embodiments, the video application may exit from video interface 500 to video player interface 541 in response to user command (e.g., activation of menu option, predefined gesture, or push of a corresponding virtual button). Video player interface 541 may include play/pause button 542, forward button 546, backward button 544, and progress bar 548 and progress indicator 550. When video 502 is played (e.g., by activating play/pause button 542 while video 502 is not playing), video 502 is played with the override from FIG. 5G (rotation of cropped video area 518) in effect, as shown by rotated person 506 in video 502.

FIGS. 6A-6B are flow diagrams illustrating a method 600 of editing videos in accordance with some embodiments. The method 600 is performed at an electronic device (e.g., device 300, FIG. 3, or portable multifunction device 100, FIG. 1) with a display and a touch-sensitive surface. In some embodiments, the display is a touch screen display and the touch-sensitive surface is on the display. In some embodiments, the display is separate from the touch-sensitive surface. Some operations in method 600 may be combined and/or the order of some operations may be changed.

As described below, the method 600 provides an intuitive way to override automatic cropping of a video and to manually crop the video with simple gestures. The method reduces the cognitive burden on a user when editing videos, thereby creating a more efficient human-machine interface. For battery-operated electronic devices, enabling a user to edit videos faster and more efficiently conserves power and increases the time between battery charges.

The device automatically crops (602) a video content item in an editing mode of a video application. For example, in FIG. 5A, when Clip 2 is added to video 502 in video editor interface 500, Clip 2 is automatically cropped into cropped video area 518 that conforms to the resolution and aspect ratio of video 502 (e.g., the resolution and aspect ratio of Clip 1, the initial clip in video 502).

The device displays (604) an automatically cropped area of the video content item on the display in the editing mode of the video application. For example, in FIG. 5A, the result of scaled, cropped video area 518 (e.g., frame(s) with person 506) is displayed in video 502.

While displaying the cropped area of the video content item on the display in the editing mode of the video application (606), the device detects (608) a gesture on the touch-sensitive surface. For example, in FIG. 5B, while video 502 is displayed, gesture 520 is detected on touchpad 355. As another example, in FIG. 5D, gesture 530 is detected on touchpad 355 while video 502 is displayed. As a further example, in FIG. 5F, gesture 538 is detected on touchpad 355 while video 502 is displayed.

In some embodiments, the gesture is a multi-finger gesture (610). For example, a three-finger drag upward gesture moves the position of the cropped area down; a three-finger drag downward gesture moves the position of the cropped area up; a three-finger drag rightward gesture moves the position of the cropped area left; a three-finger drag leftward gesture moves the position of the cropped area right; a three-finger drag up-and-to-the-right gesture moves the position of the cropped area down and to the left; and so on. To a user, the displayed area moves in the same direction as the first gesture, whereas the cropped area of the video content item, relative to the entire area of the video content item, actually moves in the opposite direction, as illustrated in FIGS. 5B-5C. Gesture 520 is a multi-finger gesture moving in rightward direction 522. In response to detection of gesture 520, cropped video area 518 is moved leftward, and displayed content in video 502 corresponding to cropped video area 518 (e.g., person 506) shifts rightward.

In response to detecting the gesture on the touch-sensitive surface (612), the device overrides (614) automatic cropping of the video content item by modifying the cropped area of the video content item in accordance with the gesture, and displays (624) the modified cropped area of the video content item on the display. For example, in FIGS. 5B-5C, in response to detection of gesture 520, cropped video area 518 is moved from its position as determined by the automatic modification of video area 514. As another example, in response to detection of gesture 530, cropped video area 518 is resized from its size as determined by the automatic modification of video area 514. As a further example, in response to detection of gesture 538, cropped video area 518 is rotated from its orientation as determined by the automatic modification of video area 514.

In some embodiments, modifying the cropped area of the video content item includes changing a position of the cropped area of the video content item (616). Changing the position of the cropped area does not affect the magnification/zoom level of the cropped area. In other words, the magnification/zoom level of the cropped area is maintained while the position is changed. For example, the cropped area may be automatically center justified, and the first gesture changes the position of the cropped area to be right, left, top, or bottom justified, without changing the magnification/zoom level of the cropped area. In some embodiments, a three-finger drag upward gesture moves the position of the cropped area down; a three-finger drag downward gesture moves the position of the cropped area up; a three-finger drag rightward gesture moves the position of the cropped area left; a three-finger drag leftward gesture moves the position of the cropped area right; a three-finger drag up-and-to-the-right gesture moves the position of the cropped area down and to the left; and so on. To a user, the displayed area moves in the same direction as the first gesture, whereas the cropped area of the video content item, relative to the entire area of the video content item, actually moves in the opposite direction, as illustrated in FIGS. 5B-5C. In response to detection of gesture 520, cropped video area 518 is moved leftward, and displayed content in video 502 corresponding to cropped video area 518 (e.g., person 506) shifts rightward. In some embodiments, a two-finger gesture is used.

In some embodiments, modifying the cropped area of the video content item includes resizing the cropped area of the video content item (618). For example, a two-finger depinch gesture increases a magnification or zoom level of the cropped area, as shown in FIGS. 5D-5E. In response to detection of gesture 530, the contents of video 502 corresponding to cropped video area 518 (e.g., person 506) is magnified; the size of cropped video area 518 is reduced. Conversely, a two-finger pinch gesture decreases a magnification or zoom level of the cropped area (not shown).

In some embodiments, a size of the automatically cropped area or a size of the modified cropped area of the video content item is at least a predefined minimum resolution (620). Thus, for example, cropped video area 518 may not be resized below the predefined minimum resolution. In some other embodiments, the amount of scaling of cropped video area 518 from one resolution to a larger resolution is restricted to a maximum level. A minimum resolution or maximum scaling amount may be set to ensure that the content in video 502 corresponding to cropped video area 518 meets some threshold quality level. The minimum resolution may be an absolute amount or relative to video 502. The maximum scaling amount effectively sets a minimum resolution relative to video 502.

In some embodiments, modifying the cropped area of the video content item includes rotating the cropped area of the video content item (622). For example, a two-finger rotation gesture 538 rotates cropped video area 518, as shown in FIGS. 5F-5G. In some embodiments, the position, size, and rotation of the cropped area are concurrently adjusted in accordance with the movements in a two-finger gesture. For example, if gesture 538 includes vertical/horizontal movement and/or pinching/de-pinching movement as well as rotational movement, cropped video area 518 may be repositioned and/or resized as well as rotated.

In some embodiments, the cropped area of the video content item (for both the automatically cropped area and the modified crop area) is displayed without displaying areas of the video content item outside the cropped area (626). For example, the cropped off areas of video area 514, such as removed areas 516, are not displayed to the user. In some embodiments, a cropping rectangle that separates the cropped area from the uncropped area of the video item is not displayed. A user visually manipulates the displayed video content item, instead of manipulating a cropping rectangle superimposed on the displayed video content item, which makes editing more intuitive and simpler for some users (e.g., novice users).

In some embodiments, the video content item is a first video clip in a sequence of video clips in the video application (628). The device maintains (630) the modified cropped area until an end of the first video clip, and automatically crops (632) a next video clip after the first video clip in the sequence of video clips. In other words, the override of automatic cropping or automatic modification ends at the end of the first video clip. For example, the override rotation of cropped video area 518 corresponding to Clip 2, as shown in FIG. 5G, does not carry over to the content of video 502 corresponding to Clip 3 or other clips in video 502, as shown in FIG. 5H.

In some embodiments, the device exits (634) the editing mode of the video application; enters (636) a playback mode of the video application; and while in the playback mode of the video application, plays (638) back the video content item with the modified cropped area. For example, the video application may exit from video interface 500 to video player interface 541 in response to detecting a user command. Video 502 may be played in video player interface 541, as shown in FIG. 5I; played video 502 has the override of the automatic modification (rotation of cropped video area 518, as evidenced by person 506 rotated off from the upright position) in effect.

It should be understood that the particular order in which the operations in FIGS. 6A-6B have been described is merely exemplary and is not intended to indicate that the described order is the only order in which the operations could be performed. One of ordinary skill in the art would recognize various ways to reorder the operations described herein.

Figure 7:
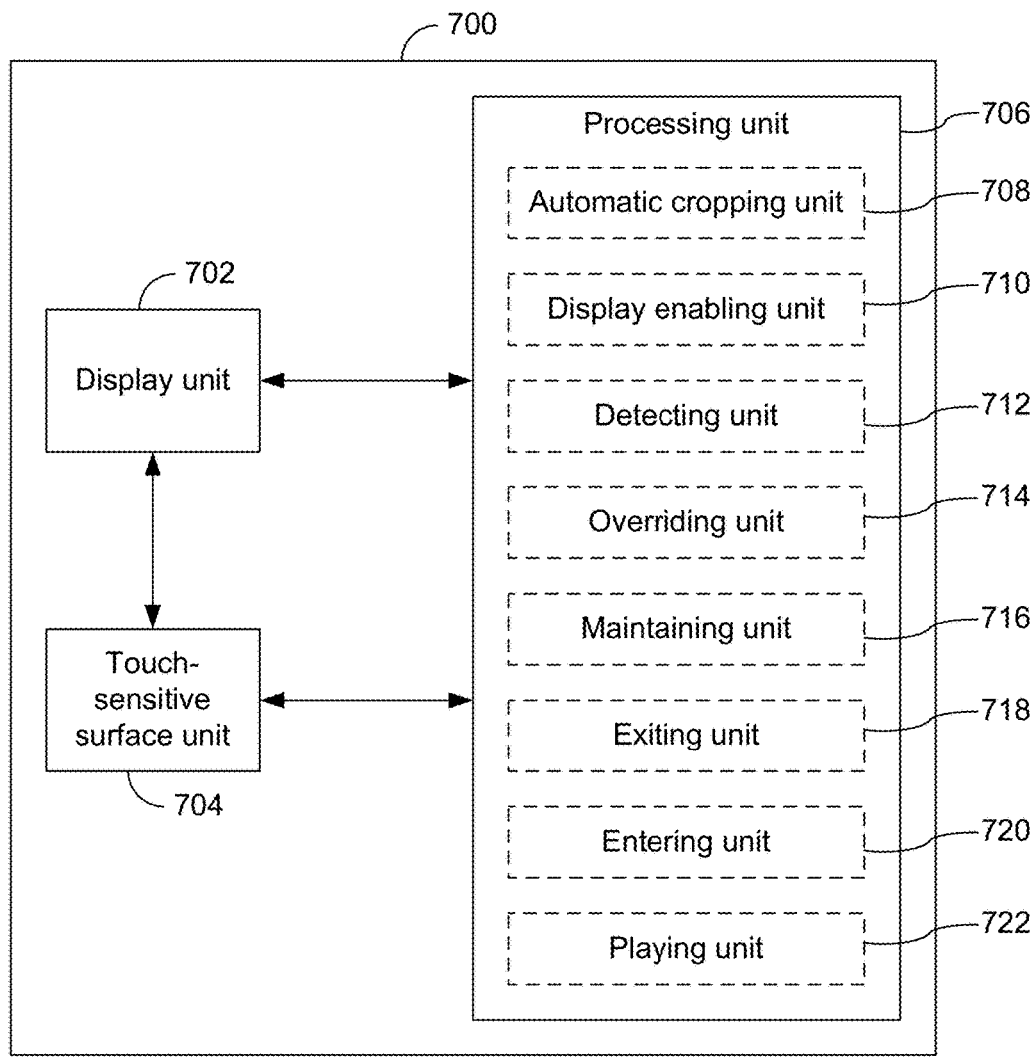
FIG. 7 is a functional block diagram of an electronic device in accordance with some embodiments.

In accordance with some embodiments, FIG. 7 shows a functional block diagram of an electronic device 700 configured in accordance with the principles of the invention as described above. The functional blocks of the device may be implemented by hardware, software, or a combination of hardware and software to carry out the principles of the invention. It is understood by persons of skill in the art that the functional blocks described in FIG. 7 may be combined or separated into sub-blocks to implement the principles of the invention as described above. Therefore, the description herein may support any possible combination or separation or further definition of the functional blocks described herein.

As shown in FIG. 7, an electronic device 700 includes a display unit 702, a touch-sensitive surface unit 704 configured to receive gestures, and a processing unit 706 coupled to the display unit 702 and the touch-sensitive surface unit 704. In some embodiments, the processing unit 706 includes a automatic cropping unit 708, a display enabling unit 710, a detecting unit 712, an overriding unit 714, a maintaining unit 716, an exiting unit 718, an entering unit 720, and a playing unit 722.

The processing unit 706 is configured to: automatically crop a video content item in an editing mode of a video application (e.g., with the automatic cropping unit 708); enable display of an automatically cropped area of the video content item on the display unit 702 in the editing mode of the video application (e.g., with the display enabling unit 710); and, while displaying the cropped area of the video content item on the display unit 702 in the editing mode of the video application: detect a gesture on the touch-sensitive surface unit 704 (e.g., with the detecting unit 712); and, in response to detecting the gesture on the touch-sensitive surface unit 704: override automatic cropping of the video content item by modifying the cropped area of the video content item in accordance with the gesture (e.g., with the overriding unit 714); and enable display of the modified cropped area of the video content item on the display unit 702 (e.g., with the display enabling unit 710).

In some embodiments, the cropped area of the video content item is displayed without displaying areas of the video content item outside the cropped area.

In some embodiments, modifying the cropped area of the video content item includes changing a position of the cropped area of the video content item.

In some embodiments, modifying the cropped area of the video content item includes resizing the cropped area of the video content item.

In some embodiments, a size of the automatic cropped area or a size of the modified cropped area of the video content item is at least a predefined minimum resolution.

In some embodiments, modifying the cropped area of the video content item includes rotating the cropped area of the video content item.

In some embodiments, the gesture is a multi-finger gesture.

In some embodiments, the video content item is a first video clip in a sequence of video clips in the video application. The processing unit 706 is configured to: maintain the modified cropped area until an end of the first video clip (e.g., with the maintaining unit 716), and automatically cropping a next video clip after the first video clip in the sequence of video clips (e.g., with the automatic cropping unit 708).

In some embodiments, the processing unit 706 is configured to: exiting the editing mode of the video application (e.g., with the exiting unit 718); entering a playback mode of the video application (e.g., with the entering unit 720); and, while in the playback mode of the video application, playing back the video content item with the modified cropped area (e.g., with the playing unit 722).

The operations in the information processing methods described above may be implemented by running one or more functional modules in information processing apparatus such as general purpose processors or application specific chips. These modules, combinations of these modules, and/or their combination with general hardware (e.g., as described above with respect to FIGS. 1A and 3) are all included within the scope of protection of the invention.

The operations described above with reference to FIGS. 6A-6B may be implemented by components depicted in FIGS. 1A-1B. For example, detection operation 608, override operation 614, and displaying operation 624 may be implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub-event, such as selection of an object on a user interface. When a respective predefined event or sub-event is detected, event recognizer 180 activates an event handler 190 associated with the detection of the event or sub-event. Event handler 190 may utilize or call data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. An electronic device, comprising: a display;
a touch-sensitive surface;
one or more processors;
memory; and
one or more programs, wherein the one or more programs are stored in the memory and configured to be executed by the one or more processors, the one or more programs including instructions for:
displaying an initial video content item having a first dimension, a first resolution, and a first aspect ratio in an editing mode of a video application;
adding a second video content item having a second dimension, a second resolution, and a second aspect ratio to the initial video content item, wherein at least one of the second dimension, second resolution, or second aspect ratio differs from the first dimension, first resolution, or first aspect ratio;
in response to adding the second video content item to the initial video content item, cropping the second video content item in the editing mode of a video application to generate a cropped area of the second video content item such that at least one of the second dimension, second resolution, or second aspect ratio of the second video content item matches the first dimension, first resolution, or first aspect ratio of the initial video content item;
displaying the cropped area of the second video content item on the display in the editing mode of the video application within a cropping region; and,
while displaying the cropped area of the second video content item on the display in the editing mode of the video application within the cropping region:
detecting a gesture in a direction on the touch-sensitive surface at a location that corresponds to the cropped area of the second video content item within the cropping region; and,
in response to detecting the gesture in the direction on the touch-sensitive surface at the location that corresponds to the cropped area of the second video content item,
shifting the second video content item within the cropping region in accordance with the direction of the gesture to display a modified cropped area of the second video content item on the display.

2. The device of claim 1, wherein the cropped area of the second video content item is displayed without displaying areas of the second video content item outside the cropped area.

3. The device of claim 1, including instructions for changing a position of the cropped area of the second video content item.

4. The device of claim 1, including instructions for resizing the cropped area of the second video content item.

5. The device of claim 4, wherein a size of the modified cropped area of the second video content item is at least a predefined minimum resolution.

6. The device of claim 1, including instructions for rotating the cropped area of the second video content item.

7. The device of claim 1, wherein the gesture is a multi-finger gesture.

8. The device of claim 1, wherein the second video content item is a first video clip in a sequence of video clips in the video application, the device including instructions for:

maintaining the modified cropped area until an end of the first video clip, and automatically cropping a next video clip after the first video clip in the sequence of video clips.

9. The device of claim 1, including instructions for:
exiting the editing mode of the video application;
entering a playback mode of the video application; and,
while in the playback mode of the video application, playing back the second video content item with the modified cropped area.

10. A method, comprising:
at an electronic device with a display and a touch-sensitive surface:
displaying an initial video content item having a first dimension, a first resolution, and a first aspect ratio in an editing mode of a video application;
adding a second video content item having a second dimension, a second resolution, and a second aspect ratio to the initial video content item, wherein at least one of the second dimension, second resolution, or second aspect ratio differs from the first dimension, first resolution, or first aspect ratio;
in response to adding the second video content item to the initial video content item, cropping the second video content item in the editing mode of a video application to generate a cropped area of the second video content item such that at least one of the second dimension, second resolution, or second aspect ratio of the second video content item matches the first dimension, first resolution or first aspect ratio of the initial video content item;
displaying the cropped area of the second video content item on the display in the editing mode of the video application within a cropping region; and,
while displaying the cropped area of the second video content item on the display in the editing mode of the video application within the cropping region:
detecting a gesture in a direction on the touch-sensitive surface at a location that corresponds to the cropped area of the second video content item within the cropping region; and,
in response to detecting the gesture in the direction on the touch-sensitive surface at the location that corresponds to the cropped area of the second video content item,
shifting the second video content item within the cropping region in accordance with the direction of the gesture to display a modified cropped area of the second video content item on the display within the cropping region.

11. The method of claim 10, wherein the cropped area of the second video content item is displayed without displaying areas of the second video content item outside the cropped area.

12. The method of claim 10, including changing a position of the cropped area of the second video content item.

13. The method of claim 10, including resizing the cropped area of the second video content item.

14. The method of claim 13, wherein a size of the modified cropped area of the second video content item is at least a predefined minimum resolution.

15. The method of claim 10, including rotating the cropped area of the second video content item.

16. The method of claim 10, wherein the gesture is a multi-finger gesture.

17. The method of claim 10, wherein the second video content item is a first video clip in a sequence of video clips in the video application, the method including: maintaining the modified cropped area until an end of the first video clip, and automatically cropping a next video clip after the first video clip in the sequence of video clips.

18. The method of claim 10, including:
exiting the editing mode of the video application; entering a playback mode of the video application; and,
while in the playback mode of the video application, playing back the second video content item with the modified cropped area.

19. A non-transitory computer readable storage medium storing one or more programs, the one or more programs comprising instructions, which when executed by an electronic device with a display and a touch-sensitive surface, cause the device to:
display an initial video content item having a first dimension, a first resolution, and a first aspect ratio in an editing mode of a video application;
add a second video content item having a second dimension, a second resolution, and a second aspect ratio to the initial video content item, wherein at least one of the second dimension, second resolution, or second aspect ratio differs from the first dimension, first resolution, or first aspect ratio;
in response to adding the second video content item to the initial video content item, crop the second video content item in the editing mode of a video application to generate a cropped area of the second video content item such that at least one of the second dimension, second resolution, or second aspect ratio of the second video content item matches the first dimension, first resolution, or first aspect ratio of the initial video content item;
display the cropped area of the second video content item on the display in the editing mode of the video application within a cropping region; and
while displaying the cropped area of the second video content item on the display in the editing mode of the video application within the cropping region:
detect a gesture in a direction on the touch-sensitive surface at a location that corresponds to the cropped area of the second video content item within the cropping region; and,
in response to detecting the gesture in the direction on the touch-sensitive surface at the location that corresponds to the cropped area of the second video content item,
shifting the second video content item within the cropping region in accordance with the direction of the gesture to display a modified cropped area of the second video content item on the display within the cropping region.

20. The storage medium of claim 19, wherein the cropped area of the second video content item is displayed without displaying areas of the second video content item outside the cropped area.

21. The storage medium of claim 19, including instructions which cause the device to change a position of the cropped area of the second video content item.

22. The storage medium of claim 19, including instructions which cause the device to resize the cropped area of the second video content item.

23. The storage medium of claim 22, wherein a size of the modified cropped area of the second video content item is at least a predefined minimum resolution.

24. The storage medium of claim 19, including instructions which cause the device to rotate the cropped area of the second video content item.

25. The storage medium of claim 19, wherein the gesture is a multi-finger gesture.

26. The storage medium of claim 19, wherein the second video content item is a first video clip in a sequence of video clips in the video application, the storage medium including instructions which cause the device to: maintain the modified cropped area until an end of the first video clip, and automatically crop a next video clip after the first video clip in the sequence of video clips.

27. The storage medium of claim 19, including instructions which cause the device to:
- exit the editing mode of the video application; entering a playback mode of the video application; and,
- while in the playback mode of the video application, play back the second video content item with the modified cropped area.

28. A graphical user interface on an electronic device with a display and a touch-sensitive surface, a memory, and one or more processors to execute one or more programs stored in the memory, the graphical user interface comprising:
- an initial video content item having a first dimension, a first resolution, and a first aspect ratio;
- a second video content item that has a second dimension, a second resolution, and a second aspect ratio wherein at least one of the second dimension, second resolution, or second aspect ratio differs from the first dimension, first resolution, or first aspect ratio;
- a cropped area of the second video content item added to the initial video content item, such that at least one of the second dimension second resolution, or second aspect ratio of the second video content item that matches the first dimension, first resolution, or first aspect ratio of the initial video content item displayed in an editing mode of a video application within a cropping region;
- wherein, while displaying the cropped area of the second video content item on the display in the editing mode of the video application within the cropping region:
- in response to detection of a gesture in a direction on the touch-sensitive surface at a location that corresponds to the cropped area of the second video content item,
- shifting the second video content item within the cropping region in accordance with the direction of the gesture to display a modified cropped area of the second video content item is displayed on the display within the cropping region.

* * * * *